US009735445B2

United States Patent
Zhamu et al.

(10) Patent No.: US 9,735,445 B2
(45) Date of Patent: Aug. 15, 2017

(54) ALKALI METAL OR ALKALI-ION BATTERIES HAVING HIGH VOLUMETRIC AND GRAVIMETRIC ENERGY DENSITIES

(71) Applicants: Aruna Zhamu, Springboro, OH (US); Bor Z Jang, Centerville, OH (US)

(72) Inventors: Aruna Zhamu, Springboro, OH (US); Bor Z Jang, Centerville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 180 days.

(21) Appl. No.: 14/756,510

(22) Filed: Sep. 14, 2015

(65) Prior Publication Data

US 2017/0077546 A1   Mar. 16, 2017

(51) Int. Cl.

| | | |
|---|---|---|
| *H01M 10/054* | (2010.01) |
| *H01M 10/0568* | (2010.01) |
| *H01M 10/0569* | (2010.01) |
| *H01M 4/38* | (2006.01) |
| *H01M 4/485* | (2010.01) |
| *H01M 4/505* | (2010.01) |
| *H01M 4/58* | (2010.01) |
| *H01M 4/583* | (2010.01) |

(Continued)

(52) U.S. Cl.
CPC ........... *H01M 10/054* (2013.01); *H01M 4/38* (2013.01); *H01M 4/485* (2013.01); *H01M 4/505* (2013.01); *H01M 4/583* (2013.01); *H01M 4/587* (2013.01); *H01M 4/5815* (2013.01); *H01M 4/5825* (2013.01); *H01M 4/60* (2013.01); *H01M 4/80* (2013.01); *H01M 4/808* (2013.01); *H01M 10/0568* (2013.01); *H01M 10/0569* (2013.01)

(58) Field of Classification Search
CPC ........... H01M 10/054; H01M 10/0568; H01M 10/0569; H01M 4/38; H01M 4/485; H01M 4/505; H01M 4/5825; H01M 4/5815; H01M 4/583; H01M 4/587; H01M 4/60; H01M 4/80; H01M 4/808
See application file for complete search history.

(56) References Cited

U.S. PATENT DOCUMENTS 7,759,008 B2   7/2010   Barker et al.
2004/0121237 A1   6/2004   Kelley et al.
(Continued)

OTHER PUBLICATIONS

International Search Report, PCT/US16/38528, Dec. 8, 2016.
(Continued)

*Primary Examiner* — Brittany Raymond

(57) ABSTRACT

Provided is an alkali metal-ion battery, comprising: (a) an anode having an anode active material dispersed in a first liquid electrolyte disposed in pores of a 3D porous anode current collector having at least 80% by volume of pores; (b) a cathode having a cathode active material dispersed in a second liquid electrolyte disposed in pores of a 3D porous cathode current collector wherein the cathode thickness-to-current collector thickness ratio is from 0.8/1 to 1/0.8; (c) a separator disposed between the anode and the cathode; wherein the anode or cathode active material loading is greater than 10 mg/cm$^2$, the anode and cathode active materials combined exceeds 40% by weight of the battery, and/or the 3D porous anode and/or cathode current collector has a thickness no less than 200 μm (preferably greater than 500 μm and more preferably greater than 700 μm) and is in physical contact with the separator.

30 Claims, 13 Drawing Sheets

(51) Int. Cl.
*H01M 4/587* (2010.01)
*H01M 4/60* (2006.01)
*H01M 4/80* (2006.01)

(56) References Cited

U.S. PATENT DOCUMENTS

| | | |
|---|---|---|
| 2004/0191617 A1 | 9/2004 | Visco et al. |
| 2004/0241545 A1 | 12/2004 | Ochiai et al. |
| 2005/0238961 A1 | 10/2005 | Barker et al. |
| 2012/0171574 A1 | 7/2012 | Zhamu et al. |
| 2013/0059174 A1 | 3/2013 | Zhamu |
| 2013/0202959 A1 | 8/2013 | Chiang et al. |
| 2013/0319870 A1 | 12/2013 | Chen et al. |
| 2013/0344397 A1 | 12/2013 | Visco et al. |
| 2014/0363746 A1 | 12/2014 | He et al. |
| 2015/0050535 A1 | 2/2015 | Amiruddin et al. |

OTHER PUBLICATIONS

Chen, Z. et al. "Three-dimensional flexible and conductive interconnected graphene networks grown by chemical vapor deposition," Nat. Mater. 10, 424-428 (2011).

X. Zhuo, et al. Journal of Power Sources 160 (2006) 698.

J. F. Whitacre, et al. "Na4Mn9O18 as a positive electrode material for an aqueous electrolyte sodium-ion energy storage device," Electrochem Communications 12 (2010) 463-466.

5 sheets of chicken wire-shaped metal web (thin, porous 2D structure) properly spaced (front view)
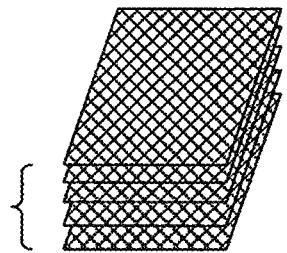
FIG. 3
These 5 sheets of thin, porous 2D structure are merged or connected at their ends (side view)
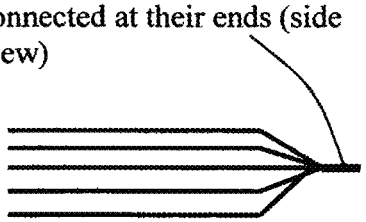

ALKALI METAL OR ALKALI-ION BATTERIES HAVING HIGH VOLUMETRIC AND GRAVIMETRIC ENERGY DENSITIES

This is a co-pending application of a patent application entitled "Process for Producing Alkali Metal or Alkali-Ion Batteries Having High Volumetric and Gravimetric Energy Densities," submitted to the USPTO on the same day.

FIELD OF THE INVENTION

This invention is directed at a primary (non-rechargeable) or secondary (rechargeable) non-lithium alkali battery (including alkali metal and alkali metal-ion cell) having a high volumetric energy density and a high gravimetric energy density. The alkali metal is selected from sodium, potassium, or a mixture of sodium and/or potassium with lithium (but not lithium alone).

BACKGROUND

The availability of safe, low-cost, long cycle life, and efficient energy storage devices is essential to increased use of renewable energy and environmentally friendly electric vehicles (EVs). Rechargeable lithium-ion (Li-ion), lithium metal, lithium-sulfur, and Li metal-air batteries are considered promising power sources for electric vehicle (EV), hybrid electric vehicle (HEV), and portable electronic devices, such as lap-top computers and mobile phones. Lithium as a metal element has the highest lithium storage capacity (3,861 mAh/g) compared to any other metal. Hence, in general, Li metal batteries (having a lithium metal anode) have a significantly higher energy density than lithium-ion batteries (having a graphite anode with a theoretical specific capacity of 372 mAh/g).

Historically, rechargeable lithium metal batteries were produced using non-lithiated compounds, such as $TiS_2$, $MoS_2$, $MnO_2$, $CoO_2$, and $V_2O_5$, as the cathode active materials, which were coupled with a lithium metal anode. When the battery was discharged, lithium ions were transferred from the lithium metal anode to the cathode through the electrolyte, and the cathode became lithiated. Unfortunately, upon repeated charges and discharges, the lithium metal resulted in the formation of dendrites at the anode that ultimately penetrated through the separator to reach the cathode, causing internal shorting, thermal runaway, and explosion. As a result of a series of accidents associated with this problem, the production of these types of secondary batteries was stopped in the early 1990's giving ways to lithium-ion batteries.

Even now, cycling stability and safety concerns remain the primary factors preventing the further commercialization of Li metal batteries (e.g. Lithium-sulfur and Lithium-transition metal oxide cells) for EV, HEV, and microelectronic device applications. Again, cycling stability and safety issues of lithium metal rechargeable batteries are primarily related to the high tendency for Li metal to form dendrite structures during cycling or overcharges, leading to internal electrical shorting and thermal runaway. This thermal runaway or even explosion is caused by the organic liquid solvents used in the electrolyte (e.g. carbonate and ether families of solvents), which are unfortunately highly volatile and flammable.

Parallel to these efforts and prompted by the aforementioned concerns over the safety of earlier lithium metal secondary batteries led to the development of lithium-ion secondary batteries, in which pure lithium metal sheet or film was replaced by carbonaceous materials (e.g. natural graphite particles) as the anode active material. The carbonaceous material absorbs lithium (through intercalation of lithium ions or atoms between graphene planes, for instance) and desorbs lithium ions during the re-charge and discharge phases, respectively, of the lithium-ion battery operation. The carbonaceous material may comprise primarily graphite that can be intercalated with lithium and the resulting graphite intercalation compound may be expressed as $Li_xC_6$, where x is typically less than 1, implying a relatively low anode specific capacity (theoretically 372 mAh/g of graphite, but practically 300-360 mAh/g). Since the cathode specific capacity is typically in the range of 130-200 mAh/g, the gravimetric and volumetric energy densities of the resulting lithium-ion cell are typically in the range of 150-200 Wh/g and 450-600 Wh/L, respectively.

As a totally distinct class of energy storage device, sodium batteries have been considered an attractive alternative to lithium batteries since sodium is abundant and the production of sodium is significantly more environmentally benign compared to the production of lithium. In addition, the high cost of lithium is a major issue and Na batteries potentially can be of significantly lower cost.

There are at least two types of batteries that operate on bouncing sodium ions ($Na^+$) back and forth between an anode and a cathode: the sodium metal battery having Na metal or alloy as the anode active material and the sodium-ion battery having a Na intercalation compound as the anode active material. Sodium ion batteries using a hard carbon-based anode active material (a Na intercalation compound) and a sodium transition metal phosphate as a cathode have been described by several research groups: X. Zhuo, et al. Journal of Power Sources 160 (2006) 698; J. Barker, et al. "Sodium Ion Batteries," U.S. Pat. No. 7,759,008 (Jul. 20, 2010 and J. F. Whitacre, et al. "$Na_4Mn_9O_{18}$ as a positive electrode material for an aqueous electrolyte sodium-ion energy storage device," Electrochemistry Communications 12 (2010) 463-466.

However, these sodium-based devices exhibit even lower specific energies and rate capabilities than Li-ion batteries. The anode active materials for Na intercalation and the cathode active materials for Na intercalation have lower Na storage capacities as compared with their Li storage capacities. For instance, hard carbon particles are capable of storing Li ions up to 300-360 mAh/g, but the same materials can store Na ions up to 150-250 mAh/g and less than 100 mAh/g for K ion storage.

Instead of hard carbon or other carbonaceous intercalation compound, sodium metal may be used as the anode active material in a sodium metal cell. However, the use of metallic sodium as the anode active material is normally considered undesirable and dangerous due to the dendrite formation, interface aging, and electrolyte incompatibility problems.

Low-capacity anode or cathode active materials are not the only problem associated with the sodium-ion battery or potassium-ion battery. There are serious design and manufacturing issues that the battery industry does not seem to be aware of, or has largely ignored. For instance, despite the seemingly high gravimetric capacities at the electrode level (based on the anode or cathode active material weight alone) as frequently claimed in open literature and patent documents, these electrodes unfortunately fail to provide batteries with high capacities at the battery cell or pack level (based on the total battery cell weight or pack weight). This is due to the notion that, in these reports, the actual active material mass loadings of the electrodes are too low. In most cases, the active material mass loadings of the anode (areal density) is significantly lower than 15 mg/cm² and mostly <8 mg/cm² (areal density=the amount of active materials per electrode cross-sectional area along the electrode thickness direction). The cathode active material amount is typically 1.5-2.5 times higher than the anode active material amount in a cell. As a result, the weight proportion of the anode active material (e.g. carbon) in a Na-ion battery cell is typically from 12% to 17%, and that of the cathode active material (e.g. $Na_xMnO_2$) from 17% to 35% (mostly <30%). The weight fraction of the cathode and anode active materials combined is typically from 30% to 45% of the cell weight.

The low active material mass loading is primarily due to the inability to obtain thicker electrodes (thicker than 100-200 μm) using the conventional slurry coating procedure. This is not a trivial task as one might think, and in reality the electrode thickness is not a design parameter that can be arbitrarily and freely varied for the purpose of optimizing the cell performance. Contrarily, thicker samples tend to become extremely brittle or of poor structural integrity and would also require the use of large amounts of binder resin. The low areal densities and low volume densities (related to thin electrodes and poor packing density) result in a relatively low volumetric capacity and low volumetric energy density of the battery cells.

With the growing demand for more compact and portable energy storage systems, there is keen interest to increase the utilization of the volume of the batteries. Novel electrode materials and designs that enable high volumetric capacities and high mass loadings are essential to achieving improved cell volumetric capacities and energy densities.

Hence, a general object of the present invention is to provide a rechargeable Na metal cell, K metal cell, hybrid Na/K metal cell, Na-ion cell, K-ion cell, or hybrid Na/K-ion cell that exhibits a high gravimetric energy density, high volumetric energy, high power density, long cycle life, and no danger of explosion due to Na/K metal dendrites. This cell includes the Na or K metal secondary cell, Na-ion cell, K-ion cell, or a non-lithium alkali metal hybrid cell, wherein at least one electrode (the cathode alone or both the anode and cathode) operates on Na or K insertion or intercalation.

One specific technical goal of the present invention is to provide a safe Na- or K-metal based battery having a long cycle life and a gravimetric energy density greater than 150 Wh/Kg and volumetric energy greater than 450 Wh/L, preferably greater than 250 Wh/Kg and 600 Wh/L, and more preferably greater than 300 Wh/Kg and 750 Wh/L (all based on the total cell weight or cell volume).

A specific object of the present invention is to provide a rechargeable non-lithium alkali metal cell based on rational materials and battery designs that overcome or significantly reduce the following issues commonly associated with conventional alkali metal cells: (a) dendrite formation (internal shorting due to sharp dendrite penetrating the separator to reach the cathode); (b) extremely low electric and ionic conductivities of Na intercalation compound in the cathode, requiring large proportion (typically 10-30%) of non-active conductive fillers and having significant proportion of non-accessible or non-reachable cathode active material); and (c) short cycle life. Another object of the present invention is to provide a simple, cost-effective, and easy-to-implement approach to preventing potential Na metal dendrite-induced internal short circuit and thermal runaway problems in various Na metal and Na-ion batteries.

SUMMARY OF THE INVENTION

The present invention provides an alkali metal battery having a high active material mass loading, exceptionally low overhead weight and volume (relative to the active material mass and volume), high volumetric capacity, and unprecedentedly high volumetric energy density and power density given the same type of battery. This alkali metal (Na, K, Na/K, Na/Li, K/Li, or Na/K/Li, but not Li alone) battery can be a primary battery (non-rechargeable) or a secondary battery (rechargeable), including a rechargeable alkali metal battery (having an alkali metal anode) and an alkali metal-ion battery (e.g. having a first Na or K intercalation compound as an anode active material and a second Na or K intercalation or absorbing compound, having a much higher electrochemical potential than the first one, as a cathode active material). The electrochemical potential of the cathode active material is higher than that of the anode active material by at least 1.0 volt, preferably at least 1.5 volts, further preferably at least 2.0 volts, more preferably at least 3.0 volts, even more preferably at least 3.5 volts, and most preferably at least 4.0 volts.

The present invention provides an alkali metal-ion battery or alkali metal battery, wherein the alkali metal is selected from sodium (Na), potassium (K), a combination of Na and K, a combination of Na and/or K with lithium (Li) and the alkali metal does not include lithium alone. The battery comprises:
  (a) an anode having an anode active material and an optional conductive additive dispersed in a first liquid electrolyte to form an anode slurry that is disposed in pores of a 3D porous anode current collector which has at least 80% by volume of pores, wherein an anode thickness-to-anode current collector thickness ratio is from 0.8/1 to 1/0.8;
  (b) a cathode having a cathode active material and an optional conductive additive dispersed in a second liquid electrolyte to form a cathode slurry that is disposed in pores of a 3D porous cathode current collector which has at least 80% by volume of pores, wherein a cathode thickness-to-cathode current collector thickness ratio is from 0.8/1 to 1/0.8;
  (c) a separator disposed between said anode and said cathode;
wherein the anode active material or the cathode active material constitutes an electrode active material loading greater than 10 mg/cm², the anode active material and the cathode active material combined exceeds 40% by weight of the battery cell weight, and/or the 3D porous anode current collector or cathode current collector has a thickness no less than 200 μm, and wherein the cathode active material releases alkali metal ions and the anode active material absorbs alkali metal ions when the battery is charged, and the anode active material releases alkali metal ions and the cathode active material absorbs alkali metal ions when the battery is discharged This alkali metal-ion secondary battery may be produced by a process comprising:
  (a) Assembling a porous cell framework composed of a first conductive foam structure (interconnected 2D or 3D network of electron-conducting paths) as an anode current collector, a second conductive foam structure as a cathode current collector, and a porous separator disposed between the first and second conductive foam structure; wherein the first and/or second conductive foam structure has a thickness no less than 100 μm (preferably greater than 200 μm, more preferably greater than 300 μm, further preferably greater than 400 μm, and most preferably greater than 500 μm) and at least 80% by volume of pores (preferably at least 85% porosity, more preferably at least 90%, and most preferably at least 95%; these pore volumes referring to amounts of pores prior to being impregnated with a suspension);

(b) Preparing a first suspension of an anode active material and an optional conductive additive dispersed in a first liquid electrolyte and a second suspension of a cathode active material and an optional conductive additive dispersed in a second liquid electrolyte; and (c) Impregnating the pores of the first foam structure with the first suspension (e.g. injecting the first suspension into pores of the first conductive foam structure) to form an anode and impregnating the pores of the second foam structure with the second suspension (e.g. injecting the second suspension into pores of the second conductive foam structure) to form a cathode to an extent that preferably the anode active material has a material mass loading no less than 20 mg/cm$^2$ in the anode or the cathode active material has a material mass loading no less than 15 mg/cm$^2$ for an organic or polymer material or no less than 30 mg/cm$^2$ (preferably no less than 40%) for an inorganic and non-polymer material in the cathode, The anode current collector, the separator, and the cathode current collector are assembled in a protective housing before, during or after the injecting (or impregnation) of the first suspension and/or the injecting (or impregnation) of the second suspension.

Another embodiment of the present invention is an alkali metal battery (primary or secondary), wherein the alkali metal is selected from sodium (Na), potassium (K), a combination of Na and K, a combination of Na and/or K with lithium (Li) and the alkali metal does not include lithium alone. This alkali metal battery comprises:

(a) an anode having an anode active material coated on or in physical contact with an anode current collector wherein the anode active material is in ionic contact with a first liquid electrolyte;

(b) a cathode having a cathode active material and an optional conductive additive dispersed in a second liquid electrolyte to form a cathode electrolyte that is disposed in pores of a 3D porous cathode current collector which has at least 80% by volume of pores, wherein a cathode thickness-to-cathode current collector thickness ratio is from 0.8/1 to 1/0.8;

(c) a separator disposed between the anode and the cathode;

wherein the cathode active material constitutes an electrode active material loading greater than 20 mg/cm$^2$, the anode active material and the cathode active material combined exceeds 30% by weight of the battery, and/or the 3D porous cathode current collector has a thickness no less than 200 μm, and wherein the cathode active material releases alkali metal ions and the anode active material absorbs alkali metal ions when the battery is charged, and the anode active material releases alkali metal ions and the cathode active material absorbs alkali metal ions when the battery is discharged.

This alkali metal battery may be produced by a process comprising:

(A) Assembling a porous cell framework composed of a first conductive foam structure as a cathode current collector, an anode current collector, and a porous separator disposed between said anode and cathode current collectors; wherein said first conductive foam structure has a thickness no less than 100 μm and at least 80% by volume of pores and said anode current collector (e.g. a Cu foil) has two opposed primary surfaces and at least one of the two primary surfaces contains a layer of sodium or potassium metal or alloy having at least 50% by weight of sodium or potassium element in said alloy;

(B) Preparing a first suspension of a cathode active material dispersed in a first liquid electrolyte, wherein the cathode active material contains multiple particles of an alkali metal intercalation compound or a alkali metal-absorbing compound that absorbs alkali metal ions when said alkali metal battery is discharged and said compound has a lithium intercalation or absorption voltage at least 1.0 volt above Na/Na$^+$ or K/K$^+$; and (C) Injecting the first suspension into pores of said first conductive foam structure to form a cathode to an extent that the cathode active material constitutes an electrode active material loading no less than 7 mg/cm$^2$, and wherein said anode, said separator, and said cathode are assembled in a protective housing before or after the injecting step is conducted.

There is no restriction on the types of anode active materials or cathode active materials that can be used in practicing the instant invention. However, preferably, the anode active material absorbs Na ions or K ions at an electrochemical potential of less than 1.0 volt (preferably less than 0.7 volts) above the Na/Na$^+$ or K/K$^+$ reference potential (i.e. relative to Na→Na$^+$+e$^-$ or K→K$^+$+e$^-$ as the standard potential) when the battery is charged.

In some embodiments, the anode contains an alkali ion source (as an anode active material) selected from foil, particles, or chips of an alkali metal, an alkali metal alloy, a mixture of alkali metal or alkali metal alloy with an alkali intercalation compound, an alkali element-containing compound, or a combination thereof.

In some preferred embodiments, the anode active material contains an alkali intercalation compound selected from petroleum coke, carbon black, amorphous carbon, activated carbon, hard carbon, soft carbon, templated carbon, hollow carbon nanowires, hollow carbon sphere, titanates, NaTi$_2$(PO$_4$)$_3$, Na$_2$Ti$_3$O$_7$, Na$_2$C$_8$H$_4$O$_4$, Na$_2$TP, Na$_x$TiO$_2$ (x=0.2 to 1.0), disodium terephthalate (Na$_2$C$_8$H$_4$O$_4$), carboxylate based materials, C$_8$H$_4$Na$_2$O$_4$, C$_8$H$_6$O$_4$, C$_8$H$_5$NaO$_4$, C$_8$Na$_2$F$_4$O$_4$, C$_{10}$H$_2$Na$_4$O$_8$, C$_{14}$H$_4$O$_6$, C$_{14}$H$_4$Na$_4$O$_8$, or a combination thereof The alkali intercalation compound or alkali-containing compound used as an anode active material may be selected from the following groups of materials:

(a) Sodium- or potassium-doped silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof;

(b) Sodium- or potassium-containing alloys or intermetallic compounds of Si, Ge, Sn, Pb, Sb, Bi, Zn, Al, Ti, Co, Ni, Mn, Cd, and their mixtures;

(c) Sodium- or potassium-containing oxides, carbides, nitrides, sulfides, phosphides, selenides, tellurides, or antimonides of Si, Ge, Sn, Pb, Sb, Bi, Zn, Al, Fe, Ti, Co, Ni, Mn, Cd, and mixtures or composites thereof;

(d) Sodium or potassium salts; and (e) Graphene sheets pre-loaded or pre-attached with sodium ions or potassium ions (herein referred to as pre-sodiated or pre-potassiated graphene sheets).

In some embodiments, the cathode active material is a sodium or potassium intercalation compound or sodium- or potassium-absorbing compound selected from an inorganic material, an organic or polymeric material, a metal oxide/phosphate/sulfide, or a combination thereof. The metal oxide/phosphate/sulfide is selected from a sodium cobalt oxide, sodium nickel oxide, sodium manganese oxide, sodium vanadium oxide, sodium-mixed metal oxide, sodium/potassium-transition metal oxide, sodium iron phosphate, sodium/potassium iron phosphate, sodium manganese phosphate, sodium/potassium manganese phosphate, sodium vanadium phosphate, sodium/potassium vanadium phosphate, sodium mixed metal phosphate, transition metal sulfide, or a combination thereof.

The inorganic material-based cathode active material may be selected from sulfur, sulfur compound, lithium polysulfide, transition metal dichalcogenide, a transition metal trichalcogenide, or a combination thereof. In some preferred embodiments, the inorganic material is selected from $TiS_2$, $TaS_2$, $MoS_2$, $NbSe_3$, $MnO_2$, $CoO_2$, an iron oxide, a vanadium oxide, or a combination thereof.

Preferably, the cathode active material contains a sodium intercalation compound or a potassium intercalation compound selected from $NaFePO_4$, $KFePO_4$, $Na_{(1-x)}K_xPO_4$, $Na_{0.7}FePO_4$, $Na_{1.5}VOPO_4F_{0.5}$, $Na_3V_2(PO_4)_3$, $Na_3V_2(PO_4)_2F_3$, $Na_2FePO_4F$, $NaFeF_3$, $NaVPO_4F$, $KVPO_4F$, $Na_3V_2(PO_4)_2F_3$, $Na_{1.5}VOPO_4F_{0.5}$, $Na_3V_2(PO_4)_3$, $NaV_6O_{15}$, $Na_xVO_2$, $Na_{0.33}V_2O_5$, $Na_xCoO_2$, $Na_{2/3}[Ni_{1/3}Mn_{2/3}]O_2$, $Na_x(Fe_{1/2}Mn_{1/2})O_2$, $Na_xMnO_2$, $Na_xK_{(1-x)}MnO_2$, $Na_{0.44}MnO_2$, $Na_{0.44}MnO_2/C$, $Na_4Mn_9O_{18}$, $NaFe_2Mn(PO_4)_3$, $Na_2Ti_3O_7$, $Ni_{1/3}Mn_{1/3}Co_{1/3}O_2$, $Cu_{0.56}Ni_{0.44}HCF$, $NiHCF$, $Na_xMnO_2$, $NaCrO_2$, $KCrO_2$, $Na_3Ti_2(PO_4)_3$, $NiCo_2O_4$, $Ni_3S_2/FeS_2$, $Sb_2O_4$, $Na_4Fe(CN)_6/C$, $NaV_{1-x}Cr_xPO_4F$, $Se_zS_y$ (y/z=0.01 to 100), Se, Alluaudites, or a combination thereof, wherein x is from 0.1 to 1.0.

Alternatively, the cathode active material may be selected from a functional material or nano-structured material having an alkali metal ion-capturing functional group or alkali metal ion-storing surface in direct contact with said electrolyte. The functional group reversibly reacts with an alkali metal ion, forms a redox pair with an alkali metal ion, or forms a chemical complex with an alkali metal ion. In some embodiments, the functional material or nano-structured material is selected from the group consisting of:

(a) A nano-structured or porous disordered carbon material selected from a soft carbon, hard carbon, polymeric carbon or carbonized resin, meso-phase carbon, coke, carbonized pitch, carbon black, activated carbon, nano-cellular carbon foam or partially graphitized carbon;
(b) A nano graphene platelet selected from a single-layer graphene sheet or multi-layer graphene platelet;
(c) A carbon nanotube selected from a single-walled carbon nanotube or multi-walled carbon nanotube;
(d) A carbon nano-fiber, nano-wire, metal oxide nano-wire or fiber, conductive polymer nano-fiber, or a combination thereof;
(e) A carbonyl-containing organic or polymeric molecule;
(f) A functional material containing a carbonyl, carboxylic, or amine group; and Combinations thereof.

The functional material or nano-structured material may be selected from the group consisting of Poly(2,5-dihydroxy-1,4-benzoquinone-3,6-methylene), $Na_xC_6O_6$ (x=1-3), $Na_2(C_6H_2O_4)$, $Na_2C_8H_4O_4$ (Na terephthalate), $Na_2C_6H_4O_4$ (Li trans-trans-muconate), 3,4,9,10- perylenetetracarboxylicacid- dianhydride (PTCDA) sulfide polymer, PTCDA, 1,4,5,8-naphthalene-tetracarboxylicacid-dianhydride (NTCDA), Benzene-1,2,4,5-tetracarboxylic dianhydride, 1,4,5,8-tetrahydroxy anthraquinon, Tetrahydroxy-p-benzoquinone, and combinations thereof.

Preferably, the functional material or nano-structured material has a specific surface area of at least 500 $m^2/g$ and, further preferably at least 1,000 $m^2/g$. In some specific embodiments, the functional material or nano-structured has a functional group selected from —COOH, =O, —NH$_2$, —OR, or —COOR, where R is a hydrocarbon radical. These functional groups are capable of reversibly capturing and storing Na or K ions.

It may be noted that a foam structure herein refers to an interconnected 2D or 3D network of electron-conducting paths. This can be, for instance, end-connected 2D mats, webs, chicken wire-like metal screens, etc., as illustrated in FIG. 3. This can also be metal foam, conductive polymer foam, graphite foam, carbon foam, or graphene foam, etc., wherein pore walls contain conductive materials.

In a preferred embodiment, as illustrated in FIG. 1(C) or 1(D), the foamed anode current collector extends all the way to an edge of the porous separator and in physical contact therewith. The foamed cathode current collector may also extend all the way to the opposite edge of the porous separator and in physical contact therewith. In other words, the pore walls of the anode current collector cover the entire anode layer, and/or the pore walls of the cathode current collector cover the entire cathode layer. In these configurations, the ratio of current collector thickness/active material layer thickness is approximately 1/1 and the electrode thickness is essentially identical to the current collector thickness (the cathode thickness-to-cathode current collector thickness ratio is approximately 1 and the anode thickness-to-anode current collector thickness ratio is approximately 1). In these situations, conductive pore walls are in the immediate vicinity of every anode active material particle or every cathode active material particle.

In certain embodiments, the ratio of current collector thickness/active material layer thickness can be from approximately 0.8/1.0 to 1.0/0.8. Expressed in an alternative manner, the cathode thickness-to-cathode current collector thickness ratio is from 0.8/1 to 1/0.8 or the anode thickness-to-anode current collector thickness ratio is from 0.8/1 to 1/0.8. It may be noted that in a conventional lithium-ion or sodium-ion battery (as schematically illustrated in FIGS. 1(A) and 1(B)), the anode (or cathode) current collector is typically a Cu foil (or Al foil) that is 8-12 μm thick. The anode active material layer coated on the Cu foil surface is typically 80-100 μm. As such, the ratio of anode current collector thickness/anode active material layer thickness is typically 8/100-12/80. The ratio of current collector thickness/active material layer thickness at the cathode side of a conventional Li-ion or Na-ion cell is also approximately 1/12.5-1/6.7. In contrast, in the invented batteries, the ratio is from 0.8/1 to 1/0.8, more desirably 0.9/1 to 1/0.9, further more desirably 0.95/1 to 1/0.95, and most desirably and typically 1/1.

The pore volume (e.g. >80%) of a foamed current collector is a critically important requirement to ensure a large proportion of active materials accommodated in the current collector. Based on this criterion, conventional paper or textiles made of natural and/or synthetic fibers do not meet this requirement since they do not have a sufficient amount of properly sized pores.

The pore sizes in the first and/or second conductive foam structure are preferably in the range from 10 nm to 100 μm, more preferably from 100 nm to 50 μm, further preferably from 500 nm to 20 μm, and even more preferably from 1 μm to 10 μm, and most preferably from 1 μm to 5 μm. These pore size ranges are designed to accommodate anode active materials (such as carbon particles) and cathode active materials (such as λ-MnO$_2$ or sodium iron phosphate), having a primary or secondary particle size typically from 10 nm to 20 μm in diameter, and most typically from 50 nm to 10 μm, further typically from 100 nm to 5 μm, and most typically from 200 nm to 3 μm.

More significantly, however, since all active material particles in a pore (e.g. with pore size of 5 μm) are, on average, within a distance of 2.5 μm from a pore wall in the 3D foam structure, electrons can be readily collected from the anode active material particle and Na or K ions do not have to undergo a long-distance solid-state diffusion. This is in contrast to the notion that some electrons in the conventional thick electrode of prior art lithium-ion or sodium-ion battery (e.g. wherein graphite particle layer 100 μm in thickness is coated onto a surface of a solid Cu foil current collector 10 μm thick) must travel at least 50 μm to get collected by a current collector (meaning a larger internal resistance and reduced ability to deliver a higher power).

In general, the first liquid electrolyte and the second liquid electrolyte are identical in a battery, but they can be different in composition. The liquid electrolytes can be an aqueous liquid, organic liquid, ionic liquid (ionic salt having a melting temperature lower than 100° C., preferably lower than room temperature, 25° C.), or a mixture of an ionic liquid and an organic liquid at a ratio from 1/100 to 100/1. The organic liquid is desirable, but the ionic liquid is preferred. A gel electrolyte can also be used provided the electrolyte has some flowability to enable injection. Some small amount 0.1% to 10% can be incorporated into the liquid electrolyte.

In a preferred embodiment, the first and/or second conductive foam structure has a thickness no less than 200 μm, and/or has at least 85% by volume of pores, and/or said anode active material has a mass loading no less than 25 mg/cm$^2$ and/or occupies at least 25% by weight or by volume of the entire battery cell, and/or the cathode active material has a mass loading no less than 20 mg/cm$^2$ for an organic or polymer material or no less than 45 mg/cm$^2$ for an inorganic and non-polymer material in the cathode and/or occupies at least 45% by weight or by volume of the entire battery cell.

In another preferred embodiment, the first and/or second conductive foam structure has a thickness no less than 300 μm, has at least 90% by volume of pores, and/or the anode active material has a mass loading no less than 30 mg/cm$^2$ and/or occupies at least 30% by weight or by volume of the entire battery cell, and/or the cathode active material has a mass loading no less than 25 mg/cm$^2$ for an organic or polymer material or no less than 50 mg/cm$^2$ for an inorganic and non-polymer material in said cathode and/or occupies at least 50% by weight or by volume of the entire battery cell.

More preferably, the first and/or second conductive foam structure has a thickness no less than 400 μm, has at least 95% by volume of pores, and/or said anode active material has a mass loading no less than 35 mg/cm$^2$ and/or occupies at least 35% by Weight or by volume of the entire battery cell, and/or the cathode active material has a mass loading no less than 30 mg/cm$^2$ for an organic or polymer material or no less than 55 mg/cm$^2$ for an inorganic and non-polymer material in the cathode and/or occupies at least 55% by weight or by volume of the entire battery cell.

The aforementioned requirements on electrode thickness, current collector pore levels, the anode active material areal mass loading or mass fraction relative to the entire battery cell, or the cathode active material areal mass loading or mass fraction relative to the entire battery cell have not been possible with conventional alkali metal or alkali ion batteries using the conventional slurry coating and drying process.

In certain embodiments, the first and/or second conductive foam structure is selected from metal foam, metal web or screen, perforated metal sheet-based 3-D structure, metal fiber mat, metal nanowire mat, conductive polymer nanofiber mat, conductive polymer foam, conductive polymer-coated fiber foam, carbon foam, graphite foam, carbon aerogel, carbon xerogel, graphene foam, graphene oxide foam, reduced graphene oxide foam, carbon fiber foam, graphite fiber foam, exfoliated graphite foam, or a combination thereof.

In some embodiments, the anode active material is a pre-sodiated or pre-potassiated version of graphene sheets selected from pristine graphene, graphene oxide, reduced graphene oxide, graphene fluoride, graphene chloride, graphene bromide, graphene iodide, hydrogenated graphene, nitrogenated graphene, boron-doped graphene, nitrogen-doped graphene, chemically functionalized graphene, a physically or chemically activated or etched version thereof, or a combination thereof. Surprisingly, without pre-sodiation or pre-potassiation, the resulting Na or K battery cell does not exhibit a satisfactory cycle life (i.e. capacity decays rapidly).

Preferably, the volume ratio of the anode active material-to-liquid electrolyte in the first dispersion is from 1/5 to 20/1 (preferably from 1/3 to 5/1) and/or the volume ratio of cathode active material-to-the liquid electrolyte in the second dispersion is from 1/5 to 20/1 (preferably from 1/3 to 5/1).

In certain embodiments, the first and/or second conductive foam structure is selected from metal foam, metal web or screen, perforated metal sheet-based 3-D structure, metal fiber mat, metal nanowire mat, conductive polymer nanofiber mat, conductive polymer foam, conductive polymer-coated fiber foam, carbon foam, graphite foam, carbon aerogel, carbon xerogel, graphene foam, graphene oxide foam, reduced graphene oxide foam, carbon fiber foam, graphite fiber foam, exfoliated graphite foam, or a combination thereof.

BRIEF DESCRIPTION OF THE DRAWINGS

FIG. 3 Schematic of a foamed or porous current collector, as an example, composed of 5 sheets of highly porous 2D webs (e.g. chicken wire-shaped thin 2D structures) that are end-connected to form a tab.

DETAILED DESCRIPTION OF PREFERRED EMBODIMENTS

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

This invention is directed at a process for producing an alkali metal battery or alkali metal ion battery (e.g. Na-ion or K-ion battery exhibiting) an exceptionally high volumetric energy density that has never been previously achieved for the same type of battery. This alkali metal battery can be a primary battery, but is preferably a secondary battery selected from an alkali metal-ion battery (e.g. using a Na intercalation compound, such as hard carbon particles) or an alkali metal secondary battery (e.g. using Na or K metal as an anode active material). The battery is based on an aqueous electrolyte, an organic electrolyte, a gel electrolyte, an ionic liquid electrolyte, or a mixture of organic and ionic liquid. The shape of an alkali metal battery can be cylindrical, square, button-like, etc. The present invention is not limited to any battery shape or configuration.

For convenience, we will use selected materials, such as $NaFePO_4$ and $\lambda-MnO_2$ particles, as illustrative examples of the cathode active material, and hard carbon and $NaTi_2(PO_4)_3$ particles as examples of the anode active material of a Na-ion cell. Similar approaches are applicable to K-ion batteries. Nickel foam, graphite foam, graphene foam, and stainless steel fiber webs are used as examples of foamed or porous thick current collectors. These examples are for illustration purposes and should not be construed as limiting the scope of the invention.

Figure 1A:
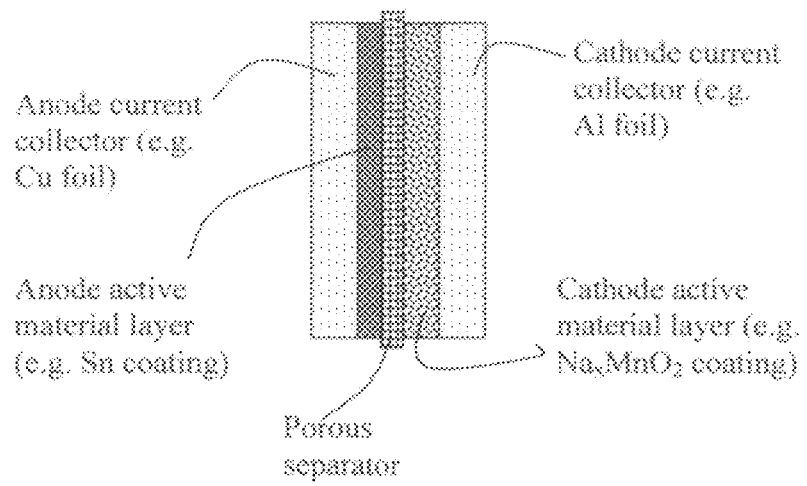
FIG. 1(A) Schematic of a prior art sodium-ion battery cell composed of an anode current collector, an anode electrode (e.g. thin Sn coating layer), a porous separator, a cathode electrode, and a cathode current collector.
Figure 1B:
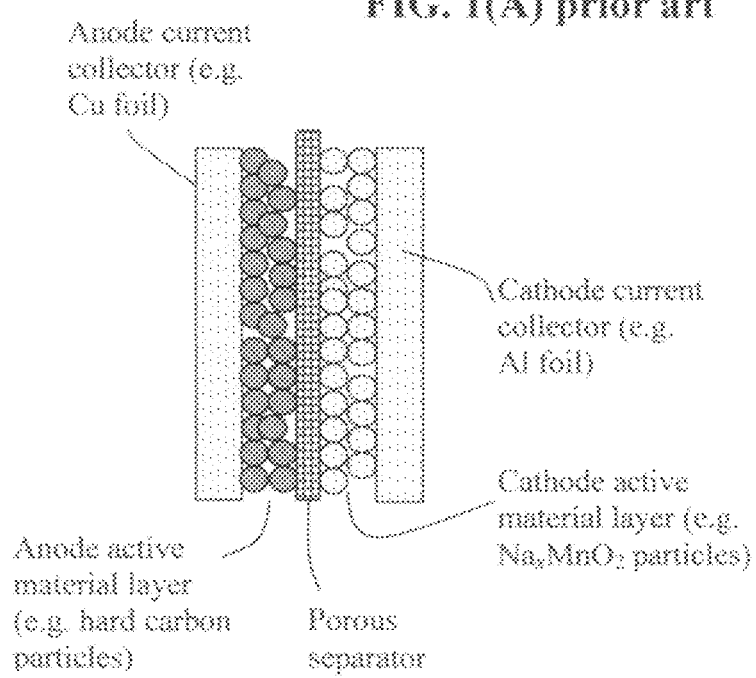
FIG. 1(B) Schematic of a prior art sodium-ion battery, wherein the electrode layer is composed of discrete particles of an active material (e.g. hard carbon particles in the anode layer or Na$_x$MnO$_2$ in the cathode layer).

As illustrated in FIGS. 1(A) and 1(B), a conventional sodium-ion battery cell is typically composed of an anode current collector (e.g. Cu foil), an anode electrode (anode active material layer), a porous separator and/or an electrolyte component, a cathode electrode (cathode active material layer), and a cathode current collector (e.g. Al foil). In a more commonly used cell configuration (FIG. 1(B)), the anode layer is composed of particles of an anode active material (e.g. hard carbon particles), a conductive additive (e.g. expanded graphite flakes), and a resin binder (e.g. SBR or PVDF). The cathode layer is composed of particles of a cathode active material (e.g. $NaFePO_4$ particles), a conductive additive (e.g. carbon black particles), and a resin binder (e.g. PVDF). Both the anode and the cathode layers are typically 60-100 μm thick (no more than 200 μm) to give rise to a presumably sufficient amount of current per unit electrode area. Using an active material layer thickness of 100 μm and the solid (Cu or Al foil) current collector layer thickness of 10 μm as examples, the resulting battery configuration has a current collector thickness-to-active material layer thickness ratio of 10/100 or 1/10 for conventional Na-ion, K-ion, and Li-ion battery cells.

This thickness range of 60-100 μm is considered an industry-accepted constraint under which a battery designer normally works under, based on the current slurry coating process (roll coating of active material-binder-additive mixture slurry). This thickness constraint is due to several reasons: (a) the existing battery electrode coating machines are not equipped to coat excessively thin or excessively thick electrode layers; (b) a thinner layer is preferred based on the consideration of reduced lithium ion diffusion path lengths; but, too thin a layer (e.g. <60 μm) does not contain a sufficient amount of an active alkali metal ion storage material (hence, insufficient current output); and (c) thicker electrodes are prone to delaminate or crack upon drying or handling after roll-coating of slurry. This constraint has made it impossible to freely increase the amount of active materials (those responsible for storing Na or K ions) without increasing the amounts of all non-active materials (e.g. current collectors and separator) in order to obtain a minimum overhead weight and a maximum sodium storage capability and, hence, a maximized energy density (Wk/kg or Wh/L of cell).

In a less commonly used cell configuration, as illustrated in FIG. 1(A), either the anode active material (e.g. NaTi$_2$(PO$_4$)$_3$) or the cathode active material (e.g. sodium transition metal oxide) is deposited in a thin film form directly onto a current collector, such as a sheet of copper foil or Al foil using sputtering. However, such a thin film structure with an extremely small thickness-direction dimension (typically much smaller than 500 nm, often necessarily thinner than 100 nm) implies that only a small amount of active material can be incorporated in an electrode (given the same electrode or current collector surface area), providing a low total Na storage capacity and low lithium storage capacity per unit electrode surface area. Such a thin film must have a thickness less than 100 nm to be more resistant to cycling-induced cracking (for the anode) or to facilitate a full utilization of the cathode active material. Such a constraint further diminishes the total Na storage capacity and the sodium storage capacity per unit electrode surface area. Such a thin-film battery has very limited scope of application.

On the anode side, a sputtered NaTi$_2$(PO$_4$)$_3$ layer thicker than 100 nm has been found to exhibit poor cracking resistance during battery charge/discharge cycles. It takes but a few cycles to get fragmented. On the cathode side, a sputtered layer of sodium metal oxide thicker than 100 nm does not allow lithium ions to fully penetrate and reach full body of the cathode layer, resulting in a poor cathode active material utilization rate. A desirable electrode thickness is at least 100 μm, with individual active material particle having a dimension desirably less than 100 nm. Thus, these thin-film electrodes (with a thickness <100 nm) directly deposited on a current collector fall short of the required thickness by three (3) orders of magnitude. As a further problem, all of the cathode active materials are not very conductive to both electrons and sodium ions. A large layer thickness implies an excessively high internal resistance and a poor active material utilization rate.

In other words, there are several conflicting factors that must be considered concurrently when it comes to the design and selection of a cathode or anode active material in terms of material type, size, electrode layer thickness, and active material mass loading. Thus far, there has been no effective solution offered by any prior art teaching to these often conflicting problems. We have solved these challenging issues, which have troubled battery designers and electrochemists alike for more than 30 years, by developing a new process of producing Alkali metal batteries as herein disclosed.

The prior art sodium or lithium battery cell is typically made by a process that includes the following steps: (a) The first step is mixing particles of the anode active material (e.g. hard carbon particles), a conductive filler (e.g. expanded graphite flakes), a resin binder (e.g. PVDF) in a solvent (e.g. NMP) to form an anode slurry. On a separate basis, particles of the cathode active material (e.g. sodium metal phosphate particles for the Na-ion cell and LFP particles for the Li-ion cell), a conductive filler (e.g. acetylene black), a resin binder (e.g. PVDF) are mixed and dispersed in a solvent (e.g. NMP) to form a cathode slurry. (b) The second step includes coating the anode slurry onto one or both primary surfaces of an anode current collector (e.g. Cu foil), drying the coated layer by vaporizing the solvent (e.g. NMP) to form a dried anode electrode coated on Cu foil. Similarly, the cathode slurry is coated and dried to form a dried cathode electrode coated on Al foil. Slurry coating is normally done in a roll-to-roll manner in a real manufacturing situation; (c) The third step includes laminating an anode/Cu foil sheet, a porous separator layer, and a cathode/Al foil sheet together to form a 3-layer or 5-layer assembly, which is cut and slit into desired sizes and stacked to form a rectangular structure (as an example of shape) or rolled into a cylindrical cell structure. (d) The rectangular or cylindrical laminated structure is then encased in an aluminum-plastic laminated envelope or steel casing. (e) A liquid electrolyte is then injected into the laminated structure to make a sodium-ion or lithium battery cell.

There are several serious problems associated with the process and the resulting sodium-ion cells (and potassium-ion and lithium-ion battery cells as well):

1) It is very difficult to produce an electrode layer (anode layer or cathode layer) that is thicker than 100 μm, let alone 200 μm. There are several reasons why this is the case. An electrode of 100 μm thickness typically requires a heating zone of 30-50 meters long in a slurry coating facility, which is too time consuming, too energy intensive, and not cost-effective. For some electrode active materials, such as metal oxide particles, it has not been possible to produce an electrode of good structural integrity that is thicker than 100 μm in a real manufacturing environment on a continuous basis. The resulting electrodes are very fragile and brittle. Thicker electrodes have a high tendency to delaminate and crack.

2) With a conventional process, as depicted in FIG. 1(A), the actual mass loadings of the electrodes and the apparent densities for the active materials are too low to achieve a gravimetric energy density of >100 Wh/kg for K-ion cells, >150 Wh/kg for Na-ion cells or >200 Wh/kg for Li-ion cells. In most cases, the anode active material mass loading of the electrodes (areal density) is significantly lower than 15-25 mg/cm$^2$ and the apparent volume density or tap density of the active material is typically less than 1.2 g/cm$^3$ even for relatively large particles of graphite. The cathode active material mass loading of the electrodes (areal density) is significantly lower than 25-45 mg/cm$^2$ for lithium metal oxide-type inorganic materials and lower than 8-15 mg/cm$^2$ for organic or polymer materials. In addition, there are so many other non-active materials (e.g. conductive additive and resin binder) that add additional weights and volumes to the electrode without contributing to the cell capacity. These low areal densities and low volume densities result in a relatively low gravimetric energy density and low volumetric energy density.

3) The conventional process requires dispersing electrode active materials (anode active material and cathode active material) in a liquid solvent (e.g. NMP) to make a slurry and, upon coating on a current collector surface, the liquid solvent has to be removed to dry the electrode layer. Once the anode and cathode layers, along with a separator layer, are laminated together and packaged in a housing to make a supercapacitor cell, one then injects a liquid electrolyte (using a salt dissolved in a solvent different than NMP) into the cell. In actuality, one makes the two electrodes wet, then makes the electrodes dry, and finally makes them wet again. Such a wet-dry-wet process is not a good process at all. Furthermore, the most commonly used solvent (NMP) is a notoriously undesirable solvent (known to cause birth defect, for instance).

4) Current sodium and potassium ion batteries still suffer from a relatively low gravimetric energy density and low volumetric energy density. Hence, neither the Na-ion nor K-ion battery has made it to the market place. Commercially available lithium-ion batteries exhibit a gravimetric energy density of approximately 150-220 Wh/kg and a volumetric energy density of 450-600 Wh/L, which are considered insufficient. Even worse are the energy densities of 80-150 Wh/kg and 300-450 Wh/L for Na-ion batteries and 50-100 Wh/kg and 150-250 Wh/L for K-ion batteries.

In literature, the energy density data reported based on either the active material weight alone or the electrode weight cannot directly translate into the energy densities of a practical battery cell or device. The "overhead weight" or weights of other device components (binder, conductive additive, current collectors, separator, electrolyte, and packaging) must also be taken into account. The convention production process results in the weight proportion of the anode active material (e.g. carbon particles) in a sodium-ion battery being typically from 12% to 15%, and that of the cathode active material (e.g. sodium transition metal oxide) from 20% to 30%.

Figure 1C:
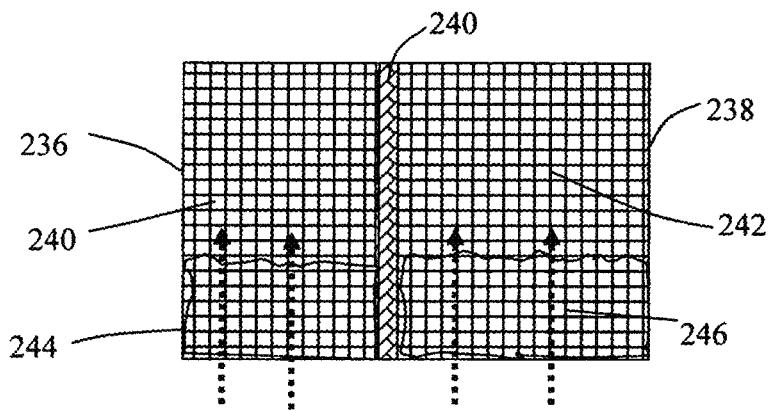
FIG. 1(C) Schematic of a presently invented sodium-ion or potassium-ion battery cell, comprising an anode current collector in the form of a highly porous foam, a porous separator, and a cathode current collector in the form of a highly porous foam. Suspensions are being injected or impregnated into pores of the two current collectors. Half of the pores have been filled, for illustration purpose.

The present invention provides a process for producing a sodium or potassium battery cell having a high electrode thickness (thickness of the electrode that contains electrode active materials, not including the thickness of any active material-free current collector layer, if existing), high active material mass loading, low overhead weight and volume, high volumetric capacitance, and high volumetric energy density. In one embodiment, as illustrated in FIGS. 1(C) and 1(D), the invented process comprises:

(A) Assembling a porous cell framework composed of a first conductive foam structure 236 as an anode current collector, a second conductive foam structure as a cathode current collector 238, and a porous separator 240 disposed between the first and second conductive foam structure;
  a. The first and/or second conductive foam structure has a thickness no less than 100 μm (preferably greater than 200 μm, more preferably greater than 300 μm, further preferably greater than 400 μm, and most preferably greater than 500 μm) and at least 80% by volume of pores (preferably at least 85% porosity, more preferably at least 90%, and most preferably at least 95%);
  b. These foam structures have essentially a porosity level of 80%-99% and remaining 1%-20% being pore walls (e.g. metal or graphite skeleton). These pores are used to accommodate a mixture of active materials (e.g. carbon particles in the anode+an optional conductive additive) and liquid electrolyte.

(B) Preparing a first suspension of an anode active material and an optional conductive additive dispersed in a first liquid electrolyte and a second suspension of a cathode active material and an optional conductive additive dispersed in a second liquid electrolyte; and (C) Injecting the first suspension into pores of the first conductive foam structure to form an anode and injecting the second suspension into pores of the second conductive foam structure to form a cathode to an extent that the anode active material constitutes an electrode active material loading no less than 20 mg/cm² (preferably no less than 25 mg/cm² and more preferably no less than 30 mg/cm²) in the anode, or the cathode active material constitutes an electrode active material mass loading no less than 45 mg/cm² (preferably greater than 50 mg/cm² and more preferably greater than 60 mg/cm²) for an inorganic material in the cathode (no less than 15 mg/cm², preferably no less than 25 mg/cm², for an organic or polymeric cathode active material), wherein the anode, the separator, and the cathode are assembled in a protective housing.
  a. Preferably, substantially all of the pores are filled with the electrode (anode or cathode) active material, optional conductive additive, and liquid electrolyte (no binder resin needed).
  b. Since there are great amounts of pores (80-99%) relative to the pore walls (1-20%), very little space is wasted ("being wasted" means not being occupied by the electrode active material and electrolyte), resulting in high amounts of electrode active material-electrolyte zones (high active material loading mass).
  c. Shown in FIG. 1(C) is a situation, wherein the porous foam structure for the anode (anode current collector 236) has been partially filled with the first suspension (anode active material and optional conductive additive dispersed in the liquid electrolyte). The top portion 240 of the anode current collector foam 236 remains empty, but the lower portion 244 has been filled with the anode suspension. Similarly, the top portion 242 of the cathode current collector foam 238 remains empty and the lower portion 246 has been filled with the cathode suspension (cathode active material dispersed in the liquid electrolyte). The four arrows represent the suspension injection directions.

Figure 1D:
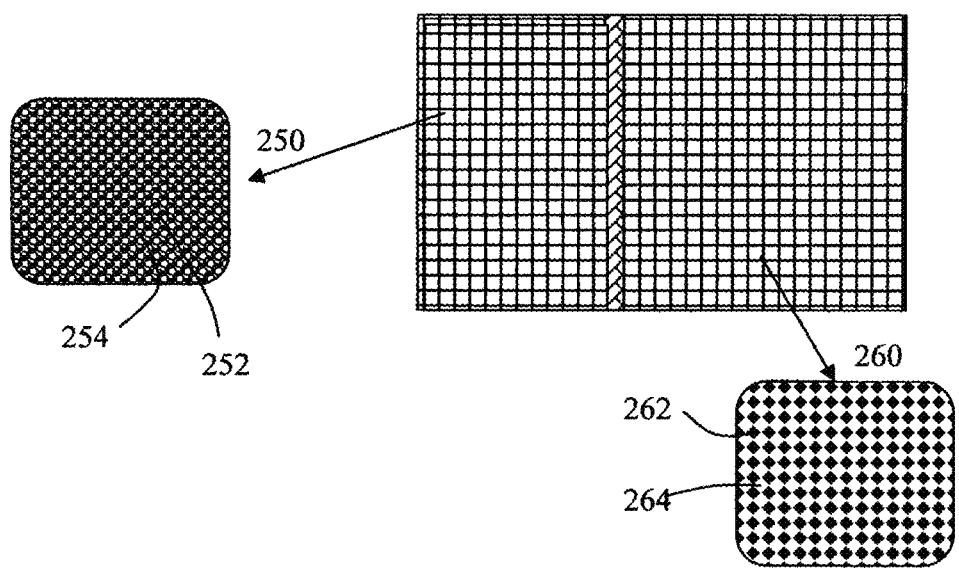
FIG. 1(D) Schematic of a presently invented Na-ion or K-ion battery cell, comprising an anode current collector in the form of a highly porous foam, a porous separator, and a cathode current collector in the form of a highly porous foam. The pores of the two foamed current collectors have been impregnated with their respective suspensions.

Shown in FIG. 1(D) is a situation, wherein both the anode current collector foam and the cathode current collector foam have been filled with their respective suspensions. As an example, a foam pore 250, in an enlarged view, is filled with the anode suspension containing hard carbon particles 252 (an anode active material) and liquid electrolyte 254. Similarly, a foam pore 260, in an enlarged view, is filled with the cathode suspension containing carbon-coated sodium transition metal oxide particles 262 (a cathode active material) and liquid electrolyte 264.

Figure 1E:
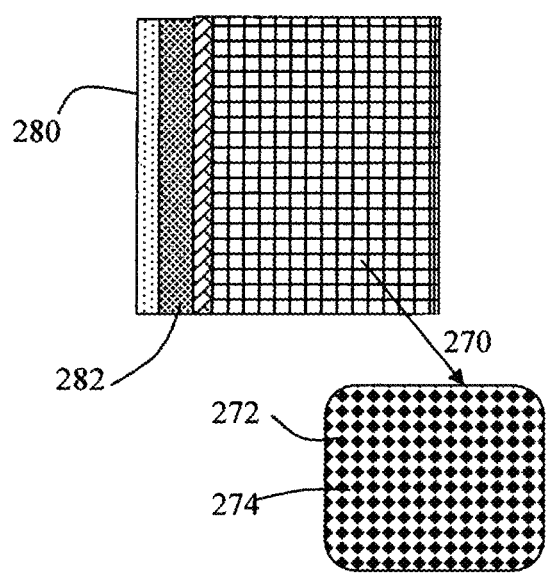
FIG. 1(E) Schematic of a presently invented Na metal or K metal battery cell, comprising an anode current collector containing a layer of Na or K metal or alloy deposited thereon, a porous separator, and a cathode current collector in the form of a highly porous foam. The pores of this foamed current collector have been impregnated with a cathode-electrolyte suspension.
Figure 2:
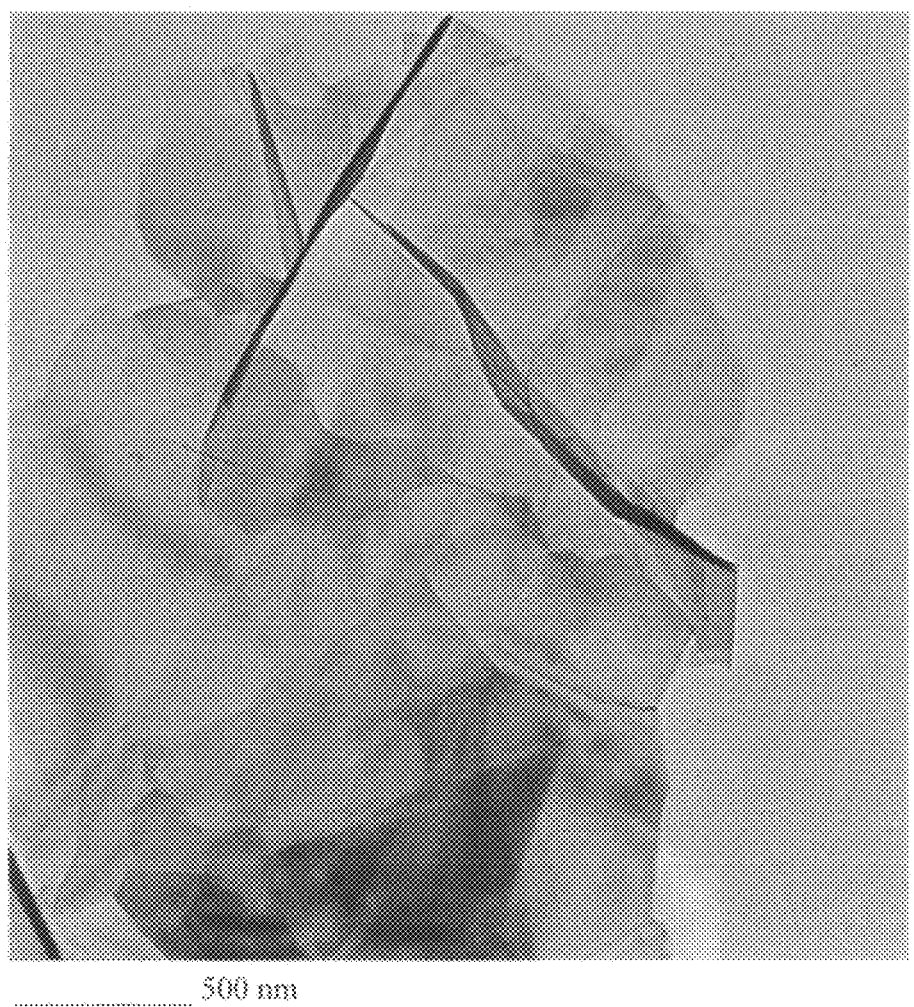
FIG. 2 An electron microscopic image of graphene sheets that are a good conductive substrate for supporting anode or cathode active materials.

An alternative configuration, as schematically illustrated in FIG. 1(E), is a presently invented sodium metal or potassium metal battery cell, comprising an anode current collector 280 containing a layer of Na or K metal 282 or Na/K metal alloy deposited thereon, a porous separator, and a cathode current collector in the form of a highly porous foam. The pores 270 of this foamed current collector have been impregnated with a suspension of cathode active material 272 and liquid electrolyte 274.

In such configurations (FIG. 1(C)-(E)), the electrons only have to travel a short distance (half of the pore size, on average; e.g. a few micrometers) before they are collected by the current collector (pore walls) since pore walls are present everywhere throughout the entire current collector (also the entire anode layer). Additionally, in each suspension, all electrode active material particles are pre-dispersed in a liquid electrolyte (no electrolyte wettability issue), eliminating the existence of dry pockets commonly present in an electrode prepared by the conventional process of wet coating, drying, packing, and electrolyte injection. Thus, the presently invented process leads to a totally unexpected advantage over the conventional battery cell production process.

In a preferred embodiment, the anode active material is a pre-sodiated or pre-potassiated version of graphene sheets selected from pristine graphene, graphene oxide, reduced graphene oxide, graphene fluoride, graphene chloride, graphene bromide, graphene iodide, hydrogenated graphene, nitrogenated graphene, chemically functionalized graphene, or a combination thereof.

The starting graphitic material for producing any one of the above graphene materials may be selected from natural graphite, artificial graphite, meso-phase carbon, meso-phase pitch, meso-carbon micro-bead, soft carbon, hard carbon, coke, carbon fiber, carbon nano-fiber, carbon nano-tube, or a combination thereof. Graphene materials are also a good conductive additive for both the anode and cathode active materials of an alkali metal battery.

The constituent graphene planes of a graphite crystallite in a natural or artificial graphite particle can be exfoliated and extracted or isolated to obtain individual graphene sheets of hexagonal carbon atoms, which are single-atom thick, provided the inter-planar van der Waals forces can be overcome. An isolated, individual graphene plane of carbon atoms is commonly referred to as single-layer graphene. A stack of multiple graphene planes bonded through van der Waals forces in the thickness direction with an inter-graphene plane spacing of approximately 0.3354 nm is commonly referred to as a multi-layer graphene. A multi-layer graphene platelet has up to 300 layers of graphene planes (<100 nm in thickness), but more typically up to 30 graphene planes (<10 nm in thickness), even more typically up to 20 graphene planes (<7 nm in thickness), and most typically up to 10 graphene planes (commonly referred to as few-layer graphene in scientific community). Single-layer graphene and multi-layer graphene sheets are collectively called "nano graphene platelets" (NGPs). Graphene sheets/platelets (collectively, NGPs) are a new class of carbon nano material (a 2-D nano carbon) that is distinct from the 0-D fullerene, the 1-D CNT or CNF, and the 3-D graphite. For the purpose of defining the claims and as is commonly understood in the art, a graphene material (isolated graphene sheets) is not (and does not include) a carbon nanotube (CNT) or a carbon nano-fiber (CNF).

Figure 4A:
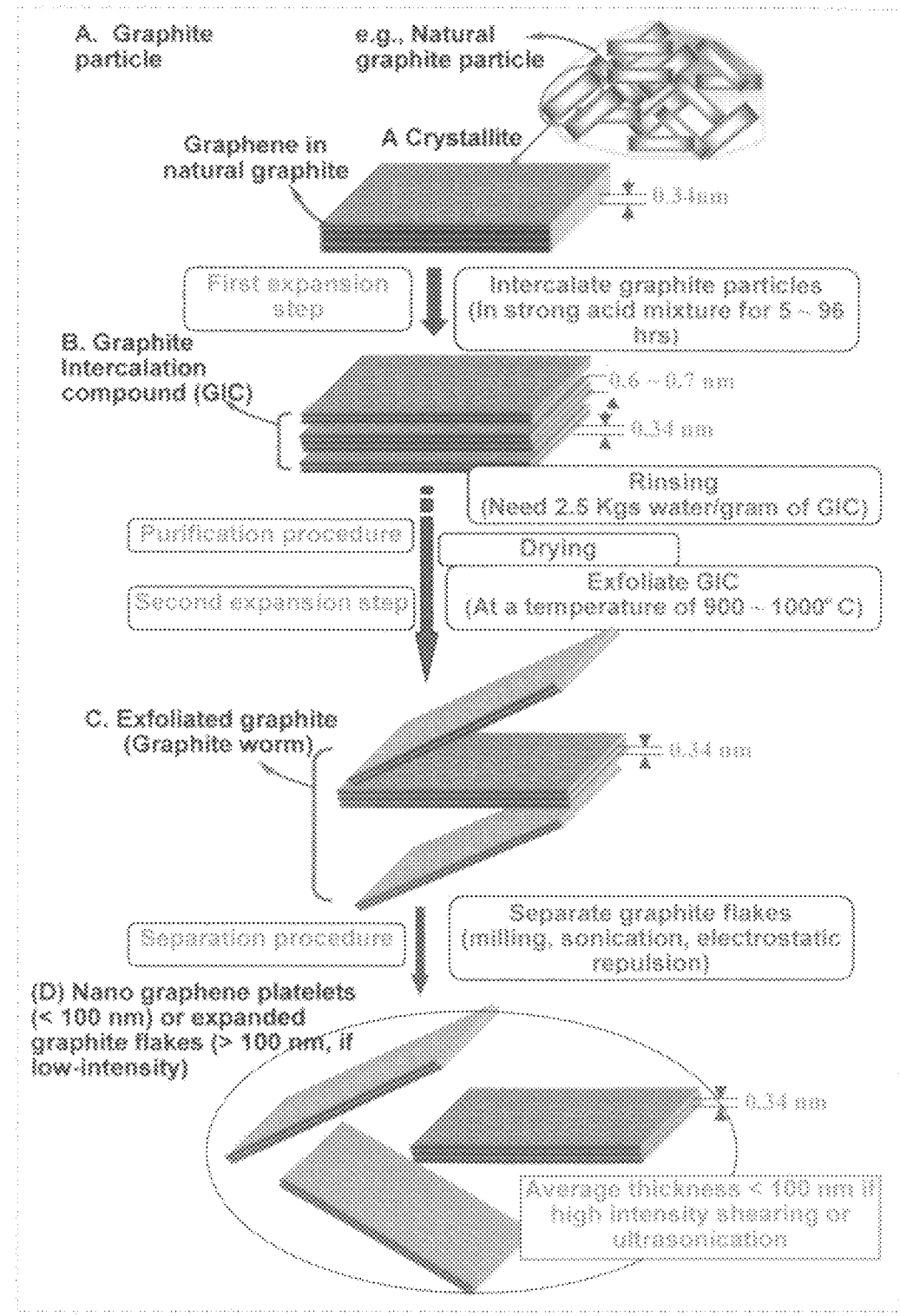
FIG. 4(A) Schematic of a commonly used process for producing exfoliated graphite, expanded graphite flakes (thickness >100 nm), and graphene sheets (thickness <100 nm, more typically <10 nm, and can be as thin as 0.34 nm).
Figure 4:
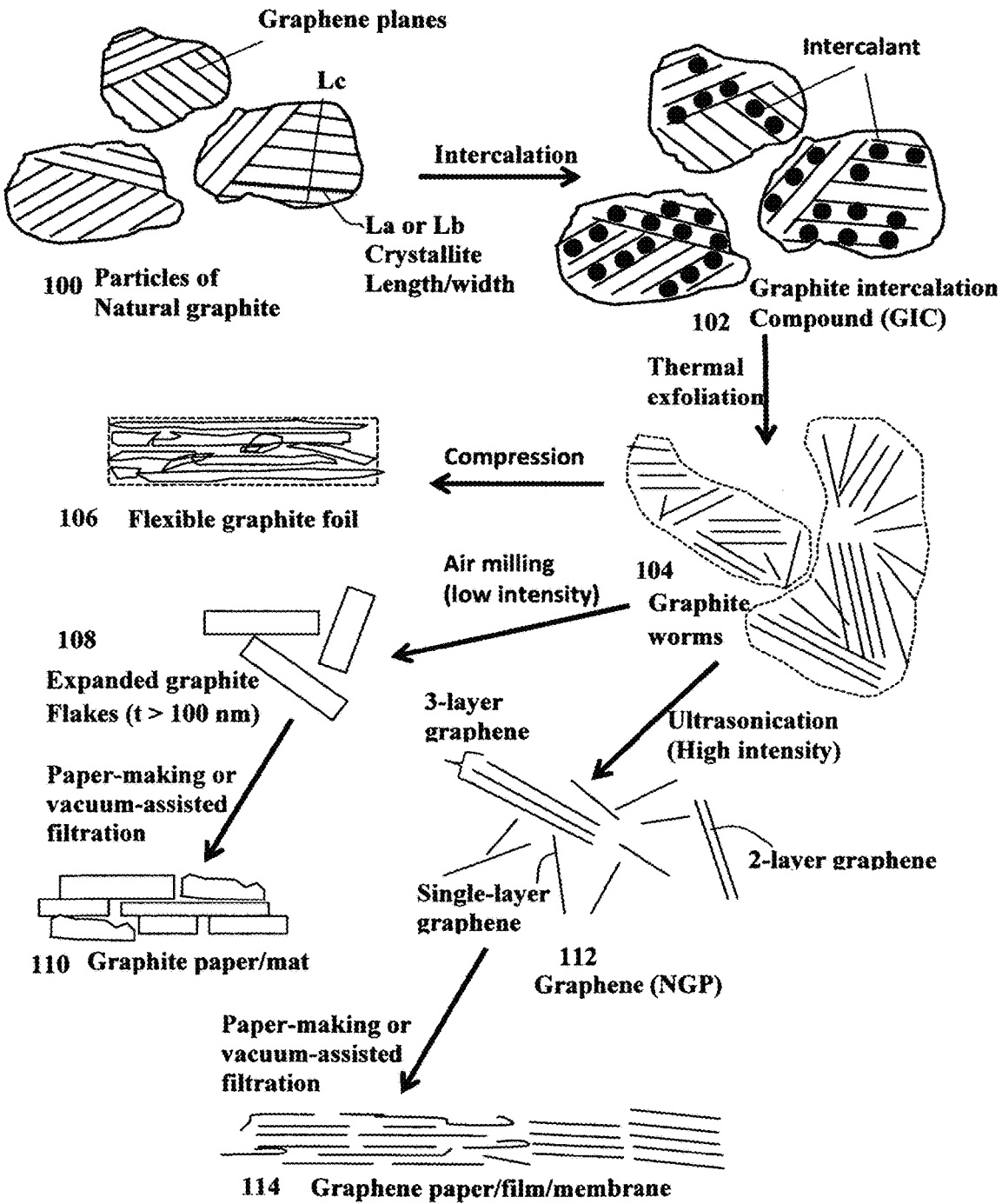
FIG. 4(B) Schematic drawing to illustrate the processes for producing exfoliated graphite, expanded graphite flakes, and graphene sheets.

In one process, graphene materials are obtained by intercalating natural graphite particles with a strong acid and/or an oxidizing agent to obtain a graphite intercalation compound (GIC) or graphite oxide (GO), as illustrated in FIG. 4(A) and FIG. 4(B) (schematic drawings). The presence of chemical species or functional groups in the interstitial spaces between graphene planes in a GIC or GO serves to increase the inter-graphene spacing ($d_{002}$, as determined by X-ray diffraction), thereby significantly reducing the van der Waals forces that otherwise hold graphene planes together along the c-axis direction. The GIC or GO is most often produced by immersing natural graphite powder (100 in FIG. 4(B)) in a mixture of sulfuric acid, nitric acid (an oxidizing agent), and another oxidizing agent (e.g. potassium permanganate or sodium perchlorate). The resulting GIC (102) is actually some type of graphite oxide (GO) particles if an oxidizing agent is present during the intercalation procedure. This GIC or GO is then repeatedly washed and rinsed in water to remove excess acids, resulting in a graphite oxide suspension or dispersion, which contains discrete and visually discernible graphite oxide particles dispersed in water. In order to produce graphene materials, one can follow one of the two processing routes after this rinsing step, briefly described below:

Route 1 involves removing water from the suspension to obtain "expandable graphite," which is essentially a mass of dried GIC or dried graphite oxide particles. Upon exposure of expandable graphite to a temperature in the range of typically 800-1,050° C. for approximately 30 seconds to 2 minutes, the GIC undergoes a rapid volume expansion by a factor of 30-300 to form "graphite worms" (104), which are each a collection of exfoliated, but largely un-separated graphite flakes that remain interconnected.

In Route 1A, these graphite worms (exfoliated graphite or "networks of interconnected/non-separated graphite flakes") can be re-compressed to obtain flexible graphite sheets or foils (106) that typically have a thickness in the range of 0.1 mm (100 μm)-0.5 mm (500 μm). Alternatively, one may choose to use a low-intensity air mill or shearing machine to simply break up the graphite worms for the purpose of producing the so-called "expanded graphite flakes" (108) which contain mostly graphite flakes or platelets thicker than 100 nm (hence, not a nano material by definition).

In Route 1B, the exfoliated graphite is subjected to high-intensity mechanical shearing (e.g. using an ultrasonicator, high-shear mixer, high-intensity air jet mill, or high-energy ball mill) to form separated single-layer and multi-layer graphene sheets (collectively called NGPs, 112), as disclosed in our U.S. application Ser. No. 10/858,814 (Jun. 3, 2004). Single-layer graphene can be as thin as 0.34 nm, while multi-layer graphene can have a thickness up to 100 nm, but more typically less than 10 nm (commonly referred to as few-layer graphene). Multiple graphene sheets or platelets may be made into a sheet of NGP paper using a paper-making process. This sheet of NGP paper is an example of the porous graphene structure layer utilized in the presently invented process.

Route 2 entails ultrasonicating the graphite oxide suspension (e.g. graphite oxide particles dispersed in water) for the purpose of separating/isolating individual graphene oxide sheets from graphite oxide particles. This is based on the notion that the inter-graphene plane separation has been increased from 0.3354 nm in natural graphite to 0.6-1.1 nm in highly oxidized graphite oxide, significantly weakening the van der Waals forces that hold neighboring planes together. Ultrasonic power can be sufficient to further separate graphene plane sheets to form fully separated, isolated, or discrete graphene oxide (GO) sheets. These graphene oxide sheets can then be chemically or thermally reduced to obtain "reduced graphene oxides" (RGO) typically having an oxygen content of 0.001%-10% by weight, more typically 0.01%-5% by weight, most typically and preferably less than 2% by weight of oxygen.

For the purpose of defining the claims of the instant application, NGPs or graphene materials include discrete sheets/platelets of single-layer and multi-layer (typically less than 10 layers) pristine graphene, graphene oxide, reduced graphene oxide (RGO), graphene fluoride, graphene chloride, graphene bromide, graphene iodide, hydrogenated graphene, nitrogenated graphene, chemically functionalized graphene, doped graphene (e.g. doped by B or N). Pristine graphene has essentially 0% oxygen. RGO typically has an oxygen content of 0.001%-5% by weight. Graphene oxide (including RGO) can have 0.001%-50% by weight of oxygen. Other than pristine graphene, all the graphene materials have 0.001%-50% by weight of non-carbon elements (e.g. O, H, N, B, F, Cl, Br, I, etc.). These materials are herein referred to as non-pristine graphene materials.

Pristine graphene, in smaller discrete graphene sheets (typically 0.3 μm to 10 μm), may be produced by direct ultrasonication (also known as liquid phase exfoliation or production) or supercritical fluid exfoliation of graphite particles. These processes are well-known in the art.

The graphene oxide (GO) may be obtained by immersing powders or filaments of a starting graphitic material (e.g. natural graphite powder) in an oxidizing liquid medium (e.g.

a mixture of sulfuric acid, nitric acid, and potassium permanganate) in a reaction vessel at a desired temperature for a period of time (typically from 0.5 to 96 hours, depending upon the nature of the starting material and the type of oxidizing agent used). As previously described above, the resulting graphite oxide particles may then be subjected to thermal exfoliation or ultrasonic wave-induced exfoliation to produce isolated GO sheets. These GO sheets can then be converted into various graphene materials by substituting —OH groups with other chemical groups (e.g. —Br, $NH_2$, etc.).

Fluorinated graphene or graphene fluoride is herein used as an example of the halogenated graphene material group. There are two different approaches that have been followed to produce fluorinated graphene: (1) fluorination of pre-synthesized graphene: This approach entails treating graphene prepared by mechanical exfoliation or by CVD growth with fluorinating agent such as $XeF_2$, or F-based plasmas; (2) Exfoliation of multilayered graphite fluorides: Both mechanical exfoliation and liquid phase exfoliation of graphite fluoride can be readily accomplished.

Interaction of $F_2$ with graphite at high temperature leads to covalent graphite fluorides $(CF)_n$ or $(C_2F)_n$, while at low temperatures graphite intercalation compounds (GIC) $C_xF$ ($2 \leq x \leq 24$) form. In $(CF)_n$, carbon atoms are sp3-hybridized and thus the fluorocarbon layers are corrugated consisting of trans-linked cyclohexane chairs. In $(C_2F)_n$ only half of the C atoms are fluorinated and every pair of the adjacent carbon sheets are linked together by covalent C—C bonds. Systematic studies on the fluorination reaction showed that the resulting F/C ratio is largely dependent on the fluorination temperature, the partial pressure of the fluorine in the fluorinating gas, and physical characteristics of the graphite precursor, including the degree of graphitization, particle size, and specific surface area. In addition to fluorine ($F_2$), other fluorinating agents may be used, although most of the available literature involves fluorination with $F_2$ gas, sometimes in presence of fluorides.

For exfoliating a layered precursor material to the state of individual layers or few-layers, it is necessary to overcome the attractive forces between adjacent layers and to further stabilize the layers. This may be achieved by either covalent modification of the graphene surface by functional groups or by non-covalent modification using specific solvents, surfactants, polymers, or donor-acceptor aromatic molecules. The process of liquid phase exfoliation includes ultra-sonic treatment of a graphite fluoride in a liquid medium.

The nitrogenation of graphene can be conducted by exposing a graphene material, such as graphene oxide, to ammonia at high temperatures (200-400° C.). Nitrogenated graphene could also be formed at lower temperatures by a hydrothermal method; e.g. by sealing GO and ammonia in an autoclave and then increased the temperature to 150-250° C. Other methods to synthesize nitrogen doped graphene include nitrogen plasma treatment on graphene, arc-discharge between graphite electrodes in the presence of ammonia, ammonolysis of graphene oxide under CVD conditions, and hydrothermal treatment of graphene oxide and urea at different temperatures.

The aforementioned features are further described and explained in detail as follows: As illustrated in FIG. 4(B), a graphite particle (e.g. 100) is typically composed of multiple graphite crystallites or grains. A graphite crystallite is made up of layer planes of hexagonal networks of carbon atoms. These layer planes of hexagonally arranged carbon atoms are substantially flat and are oriented or ordered so as to be substantially parallel and equidistant to one another in a particular crystallite. These layers of hexagonal-structured carbon atoms, commonly referred to as graphene layers or basal planes, are weakly bonded together in their thickness direction (crystallographic c-axis direction) by weak van der Waals forces and groups of these graphene layers are arranged in crystallites. The graphite crystallite structure is usually characterized in terms of two axes or directions: the c-axis direction and the a-axis (or b-axis) direction. The c-axis is the direction perpendicular to the basal planes. The a- or b-axes are the directions parallel to the basal planes (perpendicular to the c-axis direction).

Due to the weak van der Waals forces holding the parallel graphene layers, natural graphite can be treated so that the spacing between the graphene layers can be appreciably opened up so as to provide a marked expansion in the c-axis direction, and thus form an expanded graphite structure in which the laminar character of the carbon layers is substantially retained. The process for manufacturing flexible graphite is well-known in the art. In general, flakes of natural graphite (e.g. 100 in FIG. 4(B)) are intercalated in an acid solution to produce graphite intercalation compounds (GICs, 102). The GICs are washed, dried, and then exfoliated by exposure to a high temperature for a short period of time. This causes the flakes to expand or exfoliate in the c-axis direction of the graphite up to 80-300 times of their original dimensions. The exfoliated graphite flakes are vermiform in appearance and, hence, are commonly referred to as graphite worms 104. These worms of graphite flakes which have been greatly expanded can be formed without the use of a binder into cohesive or integrated sheets of expanded graphite, e.g. webs, papers, strips, tapes, foils, mats or the like (typically referred to as "flexible graphite" 106) having a typical density of about 0.04-2.0 g/cm³ for most applications.

Acids, such as sulfuric acid, are not the only type of intercalating agent (intercalant) that penetrate into spaces between graphene planes to obtain GICs. Many other types of intercalating agents, such as alkali metals (Li, K, Na, Cs, and their alloys or eutectics), can be used to intercalate graphite to stage 1, stage 2, stage 3, etc. Stage n implies one intercalant layer for every n graphene planes. For instance, a stage-1 potassium-intercalated GIC means there is one layer of K for every graphene plane; or, one can find one layer of K atoms inserted between two adjacent graphene planes in a G/K/G/K/G/KG . . . sequence, where G is a graphene plane and K is a potassium atom plane. A stage-2 GIC will have a sequence of GG/K/GG/K/GG/K/GG and a stage-3 GIC will have a sequence of GGG/K/GGG/K/GGG . . . , etc. These GICs can then be brought in contact with water or water-alcohol mixture to produce exfoliated graphite and/or separated/isolated graphene sheets.

Exfoliated graphite worms may be subjected to high-intensity mechanical shearing/separation treatments using a high-intensity air jet mill, high-intensity ball mill, or ultrasonic device to produce separated nano graphene platelets (NGPs) with all the graphene platelets thinner than 100 nm, mostly thinner than 10 nm, and, in many cases, being single-layer graphene (also illustrated as 112 in FIG. 4(B)). An NGP is composed of a graphene sheet or a plurality of graphene sheets with each sheet being a two-dimensional, hexagonal structure of carbon atoms. A mass of multiple NGPs (including discrete sheets/platelets of single-layer and/or few-layer graphene or graphene oxide may be made into a graphene film/paper (114 in FIG. 4(B)) using a film- or paper-making process. Alternatively, with a low-intensity shearing, graphite worms tend to be separated into the so-called expanded graphite flakes (108 in FIG. 4(B) having a thickness >100 nm. These flakes can be formed into graphite paper or mat 106 using a paper- or mat-making process, with or without a resin binder. Expanded graphite flakes can be used as a conductive filler in a battery. Separated NGPs (individual single-layer or multi-layer graphene sheets) can be used as an anode active material or as a supporting conductive material in the cathode of an alkali metal battery.

There is no restriction on the types of anode active materials or cathode active materials that can be used in practicing the instant invention. Preferably, in the invented process, the anode active material absorbs sodium or potassium ions at an electrochemical potential of less than 1.0 volt (preferably less than 0.7 volts) above the Na/Na$^+$ (i.e. relative to Na→Na$^+$+e$^-$ as the standard potential), or above the K/K$^+$ (i.e. relative to K→K$^+$+e$^-$ as the standard potential), when the battery is charged.

In one preferred embodiment, the anode active material is selected from the group consisting of: (a) Sodium- or potassium-doped silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof; (b) Sodium- or potassium-containing alloys or intermetallic compounds of Si, Ge, Sn, Pb, Sb, Bi, Zn, Al, Ti, Co, Ni, Mn, Cd, and their mixtures; (c) Sodium- or potassium-containing oxides, carbides, nitrides, sulfides, phosphides, selenides, tellurides, or antimonides of Si, Ge, Sn, Pb, Sb, Bi, Zn, Al, Fe, Ti, Co, Ni, Mn, Cd, and mixtures or composites thereof; (d) Sodium or potassium salts; and (e) Graphene sheets pre-loaded or pre-attached with sodium ions or potassium ions (herein referred to as pre-sodiated or pre-potassiated graphene sheets).

In the rechargeable alkali metal battery, the anode may contain an alkali ion source selected from an alkali metal, an alkali metal alloy, a mixture of alkali metal or alkali metal alloy with an alkali intercalation compound, an alkali element-containing compound, or a combination thereof. Particularly desired is an anode active material that contains an alkali intercalation compound selected from petroleum coke, carbon black, amorphous carbon, hard carbon, templated carbon, hollow carbon nanowires, hollow carbon sphere, titanates, NaTi$_2$(PO$_4$)$_3$, Na$_2$Ti$_3$O$_7$ (Sodium titanate), Na$_2$C$_8$H$_4$O$_4$ (Disodium Terephthalate), Na$_2$TP (Sodium Terephthalate), TiO$_2$, Na$_x$TiO$_2$ (x=0.2 to 1.0), carboxylate based materials, C$_8$H$_4$Na$_2$O$_4$, C$_8$H$_6$O$_4$, C$_8$H$_5$NaO$_4$, C$_8$Na$_2$F$_4$O$_4$,C$_{10}$H$_2$Na$_4$O$_8$, C$_{14}$H$_4$O$_6$, C$_{14}$H$_4$Na$_4$O$_8$, or a combination thereof.

In an embodiment, the anode may contain a mixture of 2 or 3 types of anode active materials (e.g. mixed particles of activated carbon+NaTi$_2$(PO$_4$)$_3$) and the cathode can be a sodium intercalation compound alone (e.g. Na$_x$MnO$_2$), an electric double layer capacitor-type cathode active material alone (e.g. activated carbon), a redox pair of λ-MnO$_2$/activated carbon for pseudo-capacitance.

The first or second liquid electrolyte in the invented process or battery may be selected from an aqueous electrolyte, organic electrolyte, ionic liquid electrolyte, mixture of an organic electrolyte and an ionic electrolyte, or a mixture thereof with a polymer. In some embodiments, the aqueous electrolyte contains a sodium salt or a potassium salt dissolved in water or a mixture of water and alcohol. In some embodiments, the sodium salt or potassium salt is selected from Na$_2$SO$_4$, K$_2$SO$_4$, a mixture thereof, NaOH, KOH, NaCl, KCl, NaF, KF, NaBr, KBr, NaI, KI, or a mixture thereof.

The organic solvent may contain a liquid solvent selected from the group consisting of 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofloroether (e.g. methyl perfluorobutyl ether, MFE, or ethyl perfluorobutyl ether, EFE), and combinations thereof.

The organic electrolyte may contain an alkali metal salt preferably selected from sodium perchlorate (NaClO$_4$), potassium perchlorate (KClO$_4$), sodium hexafluorophosphate (NaPF$_6$), potassium hexafluorophosphate (KPF$_6$), sodium borofluoride (NaBF$_4$), potassium borofluoride (KBF$_4$), sodium hexafluoroarsenide, potassium hexafluoroarsenide, sodium trifluoro-metasulfonate (NaCF$_3$SO$_3$), potassium trifluoro-metasulfonate (KCF$_3$SO$_3$), bis-trifluoromethyl sulfonylimide sodium (NaN(CF$_3$SO$_2$)$_2$), bis-trifluoromethyl sulfonylimide potassium (KN(CF$_3$SO$_2$)$_2$), an ionic liquid salt, or a combination thereof.

The electrolyte may further contain a lithium salt (as an additive to the sodium or potassium salt) selected from lithium perchlorate (LiClO$_4$), lithium hexafluorophosphate (LiPF$_6$), lithium borofluoride (LiBF$_4$), lithium hexafluoroarsenide (LiAsF$_6$), lithium trifluoro-metasulfonate (LiCF$_3$SO$_3$), bis-trifluoromethyl sulfonylimide lithium (LiN(CF$_3$SO$_2$)$_2$), lithium bis(oxalato)borate (LiBOB), lithium oxalyldifluoroborate (LiBF$_2$C$_2$O$_4$), lithium oxalyl-difluoroborate (LiBF$_2$C$_2$O$_4$), lithium nitrate (LiNO$_3$), Li-Fluoroalkyl-Phosphates (LiPF$_3$(CF$_2$CF$_3$)$_3$), lithium bisperfluoroethysulfonylimide (LiBETI), lithium bis(trifluoromethanesulphonypimide, lithium bis(fluorosulphonyl)imide, lithium trifluoromethanesulfonimide (LiTFSI), an ionic liquid lithium salt, or a combination thereof.

The ionic liquid is composed of ions only. Ionic liquids are low melting temperature salts that are in a molten or liquid state when above a desired temperature. For instance, an ionic salt is considered as an ionic liquid if its melting point is below 100° C. If the melting temperature is equal to or lower than room temperature (25° C.), the salt is referred to as a room temperature ionic liquid (RTIL). The IL-based lithium salts are characterized by weak interactions, due to the combination of a large cation and a charge-delocalized anion. This results in a low tendency to crystallize due to flexibility (anion) and asymmetry (cation).

Some ILs may be used as a co-solvent (not as a salt) to work with the first organic solvent of the present invention. A well-known ionic liquid is formed by the combination of a 1-ethyl-3-methyl-imidazolium (EMI) cation and an N,N-bis(trifluoromethane)sulphonamide (TFSI) anion. This combination gives a fluid with an ionic conductivity comparable to many organic electrolyte solutions, a low decomposition propensity and low vapor pressure up to ~300-400° C. This implies a generally low volatility and non-flammability and, hence, a much safer electrolyte solvent for batteries.

Ionic liquids are basically composed of organic or inorganic ions that come in an unlimited number of structural variations owing to the preparation ease of a large variety of their components. Thus, various kinds of salts can be used to design the ionic liquid that has the desired properties for a given application. These include, among others, imidazolium, pyrrolidinium and quaternary ammonium salts as cations and bis(trifluoromethanesulphonyl) imide, bis(fluorosulphonyl)imide and hexafluorophosphate as anions. Useful ionic liquid-based sodium salts (not solvent) may be composed of sodium ions as the cation and bis(trifluoromethanesulphonyl)imide, bis(fluorosulphonyl)imide or hexafluorophosphate as anions. For instance, sodium trifluoromethanesulfonimide (NaTFSI) is a particularly useful sodium salt.

Based on their compositions, ionic liquids come in different classes that include three basic types: aprotic, protic and zwitterionic types, each one suitable for a specific application. Common cations of room temperature ionic liquids (RTILs) include, but are not limited to, tetraalkylammonium, di, tri, and tetra-alkylimidazolium, alkylpyridinium, dialkyl-pyrrolidinium, dialkylpiperidinium, tetraalkylphosphonium, and trialkylsulfonium. Common anions of RTILs include, but are not limited to, $BF_4^-$, $B(CN)_4^-$, $CH_3BF_3^-$, $CH_2CHBF_3^-$, $CF_3BF_3^-$, $C_2F_5BF_3^-$, $n-C_3F_7BF_3^-$, $n-C_4F_9BF_3^-$, $PF_6^-$, $CF_3CO_2^-$, $CF_3SO_3^-$, $N(SO_2CF_3)_2^-$, $N(COCF_3)(SO_2CF_3)^-$, $N(SO_2F)_2^-$, $N(CN)_2^-$, $C(CN)_3^-$, $SCN^-$, $SeCN^-$, $CuCl_2^-$, $AlCl_4^-$, $F(HF)_{2.3}^-$, etc. Relatively speaking, the combination of imidazolium- or sulfonium-based cations and complex halide anions such as $AlCl_4^-$, $BF_4^-$, $CF_3CO_2^-$, $CF_3SO_3^-$, $NTf_2^-$, $N(SO_2F)_2^-$, or $F(HF)_{2.3}^-$ results in RTILs with good working conductivities.

RTILs can possess archetypical properties such as high intrinsic ionic conductivity, high thermal stability, low volatility, low (practically zero) vapor pressure, non-flammability, the ability to remain liquid at a wide range of temperatures above and below room temperature, high polarity, high viscosity, and wide electrochemical windows. These properties, except for the high viscosity, are desirable attributes when it comes to using an RTIL as an electrolyte co-solvent in a rechargeable lithium cell.

In the alkali metal cell, the cathode active material may contain a sodium intercalation compound (or their potassium counterparts) selected from $NaFePO_4$ (Sodium iron phosphate), $Na_{0.7}FePO_4$, $Na_{1.5}VOPO_4F_{0.5}$, $Na_3V_2(PO_4)_3$, $Na_3V2(PO_4)_2F_3$, $Na_2FePO_4F$, $NaFeF_3$, $NaVPO_4F$, $Na_3V_2(PO_4)_2F_3$, $Na_{1.5}VOPO_4F_{0.5}$, $Na_3V_2(PO_4)_3$, $NaV_6O_{15}$, $Na_xVO_2$, $Na_{0.33}V_2O_5$, $Na_xCoO_2$ (Sodium cobalt oxide), $Na_{2/3}[Ni_{1/3}Mn_{2/3}]O_2$, $Na_x(Fe_{1/2}Mn_{1/2})O_2$, $Na_xMnO_2$ (Sodium manganese bronze), $\lambda-MnO_2$, $Na_{0.44}MnO_2$, $Na_{0.44}MnO_2/C$, $Na_4Mn_9O_{18}$, $NaFe_2Mn(PO_4)_3$, $Na_2Ti_3O_7$, $Ni_{1/3}Mn_{1/3}Co_{1/3}O_2$, $Cu_{0.56}Ni_{0.44}HCF$ (Copper and nickel hexacyanoferrate), NiHCF (nickel hexacyanoferrate), $Na_xCoO_2$, $NaCrO_2$, $Na_3Ti_2(PO_4)_3$, $NiCo_2O_4$, $Ni_3S_2/FeS_2$, $Sb_2O_4$, $Na_4Fe(CN)_6/C$, $NaV_{1-x}Cr_xPO_4F$, $Se_yS_z$ (Selenium and Selenium/Sulfur, z/y from 0.01 to 100), Se (without S), Alluaudites, or a combination thereof.

Alternatively, the cathode active material may be selected from a functional material or nano-structured material having an alkali metal ion-capturing functional group or alkali metal ion-storing surface in direct contact with the electrolyte. Preferably, the functional group reversibly reacts with an alkali metal ion, forms a redox pair with an alkali metal ion, or forms a chemical complex with an alkali metal ion. The functional material or nano-structured material may be selected from the group consisting of (a) a nano-structured or porous disordered carbon material selected from a soft carbon, hard carbon, polymeric carbon or carbonized resin, meso-phase carbon, coke, carbonized pitch, carbon black, activated carbon, nano-cellular carbon foam or partially graphitized carbon; (b) a nano graphene platelet selected from a single-layer graphene sheet or multi-layer graphene platelet; (c) a carbon nanotube selected from a single-walled carbon nanotube or multi-walled carbon nanotube; (d) a carbon nano-fiber, nano-wire, metal oxide nano-wire or fiber, conductive polymer nano-fiber, or a combination thereof; (e) a carbonyl-containing organic or polymeric molecule; (f) a functional material containing a carbonyl, carboxylic, or amine group; and combinations thereof.

The functional material or nano-structured material may be selected from the group consisting of Poly(2,5-dihydroxy-1,4-benzoquinone-3,6-methylene), $Na_xC_6O_6$ (x=1-3), $Na_2(C_6H_2O_4)$, $Na_2C_8H_4O_4$ (Na terephthalate), $Na_2C_6H_4O_4$ (Li trans-trans-muconate), 3,4,9,10- perylenetetracarboxylicacid- dianhydride (PTCDA) sulfide polymer, PTCDA, 1,4,5,8-naphthalene-tetracarboxylicacid-dianhydride (NTCDA), Benzene-1,2,4,5-tetracarboxylic dianhydride, 1,4,5,8-tetrahydroxy anthraquinon, Tetrahydroxy-p-benzoquinone, and combinations thereof. Desirably, the functional material or nano-structured material has a functional group selected from —COOH, =O, —$NH_2$, —OR, or —COOR, where R is a hydrocarbon radical.

In a preferred embodiment, the functional material or nano-structured material has a specific surface area of at least 500 $m^2/g$, preferably at least 1,000 $m^2/g$.

Typically, the cathode active materials are not electrically conducting. Hence, in one embodiment, the cathode active material may be mixed with a conductive filler, such as carbon black (CB), acetylene black (AB), graphite particles, expanded graphite particles, activated carbon, meso-porous carbon, meso-carbon micro bead (MCMB), carbon nanotube (CNT), carbon nano-fiber (CNF), graphene sheet (also referred to as nano graphene platelet, NGP), carbon fiber, or a combination thereof. These carbon/graphite/graphene materials may be made into a form of fabric, mat, or paper for supporting the cathode active material.

In a preferred embodiment, the nano-scaled filaments (e.g. CNTs, CNFs, and/or NGPs) are formed into a porous nano-structure that contains massive surfaces to support either the anode active material (e.g. Na or K coating) or the cathode active material (e.g. $NaFePO_4$). The porous nano-structure should have pores having a pore size preferably from 2 nm to 50 nm, preferably 2 nm-10 nm. These pores are properly sized to accommodate the electrolyte at the cathode side and to retain the cathode active material in the pores during repeated charges/discharges. The same type of nano-structure may be implemented at the anode side to support the anode active material.

At the anode side, when an alkali metal is used as the sole anode active material in an alkali metal cell, there is concern about the formation of dendrites, which could lead to internal shorting and thermal runaway. Herein, we have used two approaches, separately or in combination, to addressing this dendrite formation issue: one involving the use of a high-concentration electrolyte and the other the use of a nano-structure composed of conductive nano-filaments to support the alkali metal at the anode. For the latter, multiple conductive nano-filaments are processed to form an integrated aggregate structure, preferably in the form of a closely packed web, mat, or paper, characterized in that these filaments are intersected, overlapped, or somehow bonded (e.g., using a binder material) to one another to form a network of electron-conducting paths. The integrated structure has substantially interconnected pores to accommodate electrolyte. The nano-filament may be selected from, as examples, a carbon nano fiber (CNF), graphite nano fiber (GNF), carbon nano-tube (CNT), metal nano wire (MNW), conductive nano-fibers obtained by electro-spinning, conductive electro-spun composite nano-fibers, nano-scaled graphene platelet (NGP), or a combination thereof. The nano-filaments may be bonded by a binder material selected from a polymer, coal tar pitch, petroleum pitch, meso-phase pitch, coke, or a derivative thereof.

Surprisingly and significantly, the nano-structure provides an environment that is conducive to uniform deposition of alkali metal ions during the battery re-charge, to the extent that no geometrically sharp structures or dendrites were found in the anode after a large number of cycles. Not wishing to be bound by any theory, but the applicants envision that the 3-D network of highly conductive nano-filaments provide a substantially uniform attraction of alkali metal ions back onto the filament surfaces during re-charging. Furthermore, due to the nanometer sizes of the filaments, there is a large amount of surface area per unit volume or per unit weight of the nano-filaments. This ultra-high specific surface area offers the alkali metal ions an opportunity to uniformly deposit a thin coating on filament surfaces. The high surface area readily accepts a large amount of alkali metal ions in the liquid electrolyte, enabling high re-charge rates for an alkali metal secondary battery.

EXAMPLES

In the examples discussed below, unless otherwise noted, raw materials such as silicon, germanium, bismuth, antimony, zinc, iron, nickel, titanium, cobalt, and tin were obtained from either Alfa Aesar of, Ward Hill, Mass., Aldrich Chemical Company of Milwaukee, Wis. or Alcan Metal Powders of Berkeley, Calif. X-ray diffraction patterns were collected using a diffractometer equipped with a copper target x-ray tube and a diffracted beam monochromator. The presence or absence of characteristic patterns of peaks was observed for each of the alloy samples studied. For example, a phase was considered to be amorphous when the X-ray diffraction pattern was absent or lacked sharp, well-defined peaks. In several cases, scanning electron microscopy (SEM) and transmission electron microscopy (TEM) were used to characterize the structure and morphology of the hybrid material samples.

In what follows, we provide some examples of several different types of anode active materials, cathode active materials, and porous current collector materials (e.g. graphite foam, graphene foam, and metal foam) to illustrate the best mode of practicing the instant invention. Theses illustrative examples and other portions of instant specification and drawings, separately or in combinations, are more than adequate to enable a person of ordinary skill in the art to practice the instant invention. However, these examples should not be construed as limiting the scope of instant invention.

Example 1

Illustrative Examples of Foamed Current Collectors

Various types of metal foams and fine metal webs/screens are commercially available for use as an anode or cathode foam structure (current collector); e.g. Ni foam, Cu foam, Al foam, Ti foam, Ni mesh/web, stainless steel fiber mesh, etc. Metal-coated polymer foams and carbon foams are also used as current collectors.

Example 2

Ni Foam and CVD Graphene Foam-Based Current Collectors on Ni Foam Templates

The procedure for producing CVD graphene foam was adapted from that disclosed in open literature: Chen, Z. et al. "Three-dimensional flexible and conductive interconnected graphene networks grown by chemical vapor deposition," Nature Materials, 10, 424-428 (2011). Nickel foam, a porous structure with an interconnected 3D scaffold of nickel was chosen as a template for the growth of graphene foam. Briefly, carbon was introduced into a nickel foam by decomposing $CH_4$ at 1,000° C. under ambient pressure, and graphene films were then deposited on the surface of the nickel foam. Due to the difference in the thermal expansion coefficients between nickel and graphene, ripples and wrinkles were formed on the graphene films. Four types of foams made in this example were used as a current collector in the presently invented lithium batteries: Ni foam, CVD graphene-coated Ni form, CVD graphene foam (Ni being etched away), and conductive polymer bonded CVD graphene foam.

In order to recover (separate) graphene foam from the supporting Ni foam, Ni frame was etched away. In the procedure proposed by Chen, et al., before etching away the nickel skeleton by a hot HCl (or $FeCl_3$) solution, a thin layer of poly (methyl methacrylate) (PMMA) was deposited on the surface of the graphene films as a support to prevent the graphene network from collapsing during nickel etching. After the PMMA layer was carefully removed by hot acetone, a fragile graphene foam sample was obtained. The use of the PMMA support layer was considered critical to preparing a free-standing film of graphene foam. Instead, we used a conducting polymer as a binder resin to hold graphene together while Ni was etched away. It may be noted that the CVD graphene foam used herein is intended as a foamed current collector to accommodate a suspension of active material dispersed in a liquid electrolyte. For instance, hard carbon nano particles were injected along with a liquid electrolyte in the anode and graphene-supported $NaFePO_4$ nano particles injected along with a liquid electrolyte in the cathode.

Example 3

Graphitic Foam-Based Current Collectors from Pitch-Based Carbon Foams

Pitch powder, granules, or pellets are placed in a aluminum mold with the desired final shape of the foam. Mitsubishi ARA-24 meso-phase pitch was utilized. The sample is evacuated to less than 1 torr and then heated to a temperature approximately 300° C. At this point, the vacuum was released to a nitrogen blanket and then a pressure of up to 1,000 psi was applied. The temperature of the system was then raised to 800° C. This was performed at a rate of 2 degree C./min. The temperature was held for at least 15 minutes to achieve a soak and then the furnace power was turned off and cooled to room temperature at a rate of approximately 1.5 degree C./min with release of pressure at a rate of approximately 2 psi/min. Final foam temperatures were 630° C. and 800° C. During the cooling cycle, pressure is released gradually to atmospheric conditions. The foam was then heat treated to 1050° C. (carbonized) under a nitrogen blanket and then heat treated in separate runs in a graphite crucible to 2500° C. and 2800° C. (graphitized) in Argon.

Example 4

Some Examples of Electrolytes Used

Preferred non-lithium alkali metal salts include: sodium perchlorate ($NaClO_4$), potassium perchlorate ($KClO_4$), sodium hexafluorophosphate (NaPF$_6$), potassium hexafluorophosphate (KPF$_6$), sodium borofluoride (NaBF$_4$), potassium borofluoride (KBF$_4$), sodium hexafluoroarsenide, potassium hexafluoroarsenide, sodium trifluoro-metasulfonate (NaCF$_3$SO$_3$), potassium trifluoro-metasulfonate (KCF$_3$SO$_3$), bis-trifluoromethyl sulfonylimide sodium (NaN(CF$_3$SO$_2$)$_2$), and bis-trifluoromethyl sulfonylimide potassium [KN(CF$_3$SO$_2$)$_2$].

For aqueous electrolyte, sodium salt or potassium salt is preferably selected from Na$_2$SO$_4$, K$_2$SO$_4$, a mixture thereof, NaOH, KOH, NaCl, KCl, NaF, KF, NaBr, KBr, NaI, KI, or a mixture thereof. The salt concentrations used in the present study were from 0.3M to 3.0 M (most often 0.5M to 2.0M).

A wide range of lithium salts can be added as a second salt (a modifier additive) dissolved in an organic liquid solvent (alone or in a mixture with another organic liquid or an ionic liquid), if so desired. The following are good choices for lithium salts that tend to be dissolved well in selected organic or ionic liquid solvents: lithium borofluoride (LiBF$_4$), lithium trifluoro-metasulfonate (LiCF$_3$SO$_3$), lithium bis-trifluoromethyl sulfonylimide (LiN(CF$_3$SO$_2$)$_2$ or LITFSI), lithium bis(oxalato)borate (LiBOB), lithium oxalyldifluoroborate (LiBF$_2$C$_2$O$_4$), and lithium bisperfluoroethy-sulfonylimide (LiBETI). A good electrolyte additive for helping to stabilize Li metal is LiNO$_3$. Particularly useful ionic liquid-based lithium salts include: lithium bis(trifluoro methanesulfonyl)imide (LiTFSI).

Preferred organic liquid solvents include: ethylene carbonate (EC), dimethyl carbonate (DMC), methylethyl carbonate (MEC), diethyl carbonate (DEC), propylene carbonate (PC), acetonitrile (AN), vinylene carbonate (VC), allyl ethyl carbonate (AEC), 1,3-dioxolane (DOL), 1,2-dimethoxyethane (DME), tetraethylene glycol dimethylether (TEGDME), Poly(ethylene glycol) dimethyl ether (PEGDME), diethylene glycol dibutyl ether (DEGDBE), 2-ethoxyethyl ether (EEE), hydrofloroether (e.g. TPTP), sulfone, and sulfolane.

Preferred ionic liquid solvents may be selected from a room temperature ionic liquid (RTIL) having a cation selected from tetraalkylammonium, di-alkylimidazolium, alkylpyridinium, dialkyl-pyrrolidinium, or dialkylpiperidinium. The counter anion is preferably selected from BF$_4^-$, B(CN)$_4^-$, CF$_3$CO$_2^-$, CF$_3$SO$_3^-$, N(SO$_2$CF$_3$)$_2^-$, N(COCF$_3$)(SO$_2$CF$_3$)$^-$, or N(SO$_2$F)$_2^-$. Particularly useful ionic liquid-based solvents include N-n-butyl-N-ethylpyrrolidinium bis (trifluoromethane sulfonyl)imide (BEPyTFSI), N-methyl-N-propylpiperidinium bis(trifluoromethyl sulfonyl)imide (PP$_{13}$TFSI), and N,N-diethyl-N-methyl-N-(2-methoxyethyl) ammonium bis(trifluoromethylsulfonyl)imide.

Example 4

Preparation of Graphene Oxide (GO) and Reduced Graphene Oxide (RGO) Nano Sheets from Natural Graphite Powder Natural graphite from Huadong Graphite Co. (Qingdao, China) was used as the starting material. GO was obtained by following the well-known modified Hummers method, which involved two oxidation stages. In a typical procedure, the first oxidation was achieved in the following conditions: 1100 mg of graphite was placed in a 1000 mL boiling flask. Then, 20 g of K$_2$S$_2$O$_8$, 20 g of P$_2$O$_5$, and 400 mL of a concentrated aqueous solution of H$_2$SO$_4$ (96%) were added in the flask. The mixture was heated under reflux for 6 hours and then let without disturbing for 20 hours at room temperature. Oxidized graphite was filtered and rinsed with abundant distilled water until neutral pH. A wet cake-like material was recovered at the end of this first oxidation.

For the second oxidation process, the previously collected wet cake was placed in a boiling flask that contains 69 mL of a concentrated aqueous solution of H$_2$SO$_4$ (96%). The flask was kept in an ice bath as 9 g of KMnO$_4$ was slowly added. Care was taken to avoid overheating. The resulting mixture was stirred at 35° C. for 2 hours (the sample color turning dark green), followed by the addition of 140 mL of water. After 15 min, the reaction was halted by adding 420 mL of water and 15 mL of an aqueous solution of 30 wt % H$_2$O$_2$. The color of the sample at this stage turned bright yellow. To remove the metallic ions, the mixture was filtered and rinsed with a 1:10 HCl aqueous solution. The collected material was gently centrifuged at 2700 g and rinsed with deionized water. The final product was a wet cake that contained 1.4 wt % of GO, as estimated from dry extracts. Subsequently, liquid dispersions of GO platelets were obtained by lightly sonicating wet-cake materials, which were diluted in deionized water.

Surfactant-stabilized RGO (RGO-BS) was obtained by diluting the wet-cake in an aqueous solution of surfactants instead of pure water. A commercially available mixture of cholate sodium (50 wt. %) and deoxycholate sodium (50 wt. %) salts provided by Sigma Aldrich was used. The surfactant weight fraction was 0.5 wt. %. This fraction was kept constant for all samples. Sonication was performed using a Branson Sonifier S-250A equipped with a 13 mm step disruptor horn and a 3 mm tapered micro-tip, operating at a 20 kHz frequency. For instance, 10 mL of aqueous solutions containing 0.1 wt. % of GO was sonicated for 10 min and subsequently centrifuged at 2700 g for 30 min to remove any non-dissolved large particles, aggregates, and impurities. Chemical reduction of as-obtained GO to yield RGO was conducted by following the method, which involved placing 10 mL of a 0.1 wt. % GO aqueous solution in a boiling flask of 50 mL. Then, 10 µL of a 35 wt. % aqueous solution of N$_2$H$_4$ (hydrazine) and 70 mL of a 28 wt. % of an aqueous solution of NH$_4$OH (ammonia) were added to the mixture, which was stabilized by surfactants. The solution was heated to 90° C. and refluxed for 1 h. The pH value measured after the reaction was approximately 9. The color of the sample turned dark black during the reduction reaction.

RGO was used as a conductive additive in either or both of the anode and cathode in certain alkali metal batteries presently invented. Pre-sodiated RGO (e.g. RGO+sodium particles or RGO pre-deposited with sodium coating) was also use as an anode active material in selected sodium-ion cells.

For comparison purposes, slurry coating and drying procedures were conducted to produce conventional electrodes. Electrodes and a separator disposed between two electrodes were then assembled and encased in an Al-plastic laminated packaging envelop, followed by liquid electrolyte injection to form a sodium or potassium battery cell.

Example 5

Preparation of Pristine Graphene Sheets (0% Oxygen)

Recognizing the possibility of the high defect population in GO sheets acting to reduce the conductivity of individual graphene plane, we decided to study if the use of pristine graphene sheets (non-oxidized and oxygen-free, non-halogenated and halogen-free, etc.) can lead to a conductive additive having a high electrical and thermal conductivity.

Pre-sodiated pristine graphene was also used as an anode active material. Pristine graphene sheets were produced by using the direct ultrasonication or liquid-phase production process.

In a typical procedure, five grams of graphite flakes, ground to approximately 20 μm or less in sizes, were dispersed in 1,000 mL of deionized water (containing 0.1% by weight of a dispersing agent, Zonyl® FSO from DuPont) to obtain a suspension. An ultrasonic energy level of 85 W (Branson 5450 Ultrasonicator) was used for exfoliation, separation, and size reduction of graphene sheets for a period of 15 minutes to 2 hours. The resulting graphene sheets are pristine graphene that have never been oxidized and are oxygen-free and relatively defect-free. Pristine graphene is essentially free from any non-carbon elements.

Pristine graphene sheets, as a conductive additive, along with an anode active material (or cathode active material in the cathode) were then incorporated in a battery using both the presently invented procedure of slurry injection into foam pores and conventional procedure of slurry coating, drying and layer laminating. Both alkali metal-ion batteries and alkali metal batteries (injection into cathode only) were investigated. In the latter batteries, primary or secondary, the anode is either Na foil or K chips supported by graphene sheets.

Example 6

Preparation of Pre-Sodiated Graphene Fluoride Sheets as an Anode Active Material of a Sodium-Ion Battery Several processes have been used by us to produce graphene fluoride (GF), but only one process is herein described as an example. In a typical procedure, highly exfoliated graphite (HEG) was prepared from intercalated compound $C_2F \cdot xClF_3$. HEG was further fluorinated by vapors of chlorine trifluoride to yield fluorinated highly exfoliated graphite (FHEG). Pre-cooled Teflon reactor was filled with 20-30 mL of liquid pre-cooled $ClF_3$, the reactor was closed and cooled to liquid nitrogen temperature. Then, no more than 1 g of HEG was put in a container with holes for $ClF_3$ gas to access and situated inside the reactor. In 7-10 days a gray-beige product with approximate formula $C_2F$ was formed.

Subsequently, a small amount of FHEG (approximately 0.5 mg) was mixed with 20-30 mL of an organic solvent (methanol and ethanol, separately) and subjected to an ultrasound treatment (280 W) for 30 min, leading to the formation of homogeneous yellowish dispersions. Upon removal of solvent, the dispersion became a brownish powder. The graphene fluoride powder was mixed with sodium chips in a liquid electrolyte, allowing for pre-sodiation to occur before or after injection into pores of an anode current collector.

Example 7

Preparation of Disodium Terephthalate ($Na_2C_8H_4O_4$) as an Anode Active Material of a Sodium-Ion Battery Pure disodium terephthalate was obtained by the recrystallization method. An aqueous solution was prepared via the addition of terephthalic acid to an aqueous NaOH solution and then ethanol (EtOH) was added to the mixture to precipitate disodium terephthalate in a water/EtOH mixture. Because of resonance stabilization, terephtalic acid has relatively low pKa values, which allow easy deprotonation by NaOH, affording disodium terephthalate ($Na_2TP$) through the acid-base chemistry. In a typical procedure, terephthalic acid (3.00 g, 18.06 mmol) was treated with sodium hydroxide (1.517 g, 37.93 mmol) in EtOH (60 mL) at room temperature. After 24 h, the suspended reaction mixture was centrifuged and the supernatant solution was decanted. The precipitate was re-dispersed in EtOH and then centrifuged again. This procedure was repeated twice to yield a white solid. The product was dried in vacuum at 150° C. for 1 h. Compounds, reagents, and solvents were purchased from standard suppliers and used without further purification. In a separate sample, GO was added to aqueous NaOH solution (5% by wt. of GO sheets) to prepare sheets of graphene-supported disodium terephthalate under comparable reaction conditions.

Both carbon-disodium terephthalate mixture powder and graphene-supported disodium terephthalate, separately, each along with a liquid electrolyte, were then incorporated in a battery using both the presently invented procedure of slurry injection into foam pores of an anode current collector and the conventional procedure of slurry coating, drying and layer laminating.

Example 8

Cathode Active Materials Based on Mixed Transition Metal Oxides

As examples, for the synthesis of $Na_{1.0}Li_{0.2}Ni_{0.25}Mn_{0.75}O_\delta$, $Ni_{0.25}Mn_{0.75}CO_3$, or $Ni_{0.25}Mn_{0.75}(OH)_2$ cathode active material, $Na_2CO_3$, and $Li_2CO_3$ were used as starting compounds. Materials in appropriate mole ratios were ground together and heat-treated; first at 500° C. for 8 h in air, then finally at 800° C. for 8 h in air, and furnace cooled.

For electrode preparation using a conventional procedure, a sheet of aluminum foil was coated with N-methylpyrrolidinone (NMP) slurry of the cathode mixture. The electrode mixture is composed of 82 wt % active oxide material, 8 wt % conductive carbon black (Timcal Super-P), and 10 wt. % PVDF binder (Kynar). After casting, the electrode was initially dried at 70° C. for 2 h, followed by dynamic vacuum drying at 80° C. for at least 6 h. The sodium metal foil was cut from sodium chunks (Aldrich, 99%) that were cleaned of any oil using hexanes, then rolled and punched out. For the preparation of the presently invented slurry, NMP was replaced by a liquid electrolyte (propylene carbonate with 1 M of $NaClO_4$). Such a slurry was directly injected into the pores of a cathode current collector.

Both $Na_{1.0}Li_{0.2}Ni_{0.25}Mn_{0.75}O_\delta$ powder (with a carbon black powder as a conductive additive) and graphene-supported $Na_{1.0}Li_{0.2}Ni_{0.25}Mn_{0.75}O_\delta$ powder, separately, along with a liquid electrolyte, were then incorporated in a battery using both the presently invented procedure of slurry injection into foam pores of a cathode current collector and the conventional procedure of slurry coating, drying and layer laminating.

The electrolyte was propylene carbonate with 1 M of $NaClO_4$ electrolyte salt (Aldrich, 99%). Pouch cells were galvanostatically cycled to a cutoff of 4.2 V vs. $Na/Na^+$ (15 mA/g) and then discharged at various current rates to a cutoff voltage of 2.0 V.

In all battery cells prepared, charge storage capacities were measured periodically and recorded as a function of the number of cycles. The specific discharge capacity herein referred to is the total charge inserted into the cathode during the discharge, per unit mass of the composite cathode (counting the weights of cathode active material, conductive additive or support, binder, and any optional additive combined, but excluding the current collector). The specific charge capacity refers to the amount of charges per unit mass of the composite cathode. The specific energy and specific power values presented in this section are based on the total cell weight for all pouch cells. The morphological or microstructural changes of selected samples after a desired number of repeated charging and recharging cycles were observed using both transmission electron microscopy (TEM) and scanning electron microscopy (SEM).

Example 9

$Na_3V_2(PO_4)_3/C$ and $Na_3V_2(PO_4)_3$/Graphene Cathodes

The $Na_3V_2(PO_4)_3$/C sample was synthesized by a solid state reaction according to the following procedure: a stoichiometric mixture of $NaH_2PO_4 \cdot 2H_2O$ (99.9%, Alpha) and $V_2O_3$ (99.9%, Alpha) powders was put in an agate jar as a precursor and then the precursor was ball-milled in a planetary ball mill at 400 rpm in a stainless steel vessel for 8 h. During ball milling, for the carbon coated sample, sugar (99.9%, Alpha) was also added as the carbon precursor and the reductive agent, which prevents the oxidation of $V^{3+}$. After ball milling, the mixture was pressed into a pellet and then heated at 900° C. for 24 h in Ar atmosphere. Separately, the $Na_3V_2(PO_4)_3$/Graphene cathode was prepared in a similar manner, but with sugar replaced by graphene oxide.

The cathode active materials were used in several Na metal cells containing 1 M of $NaPF_6$ salt in PC+DOL as the electrolyte. Both conventional NMP slurry coating process and the invented direct electrolyte injection into current collector pores were followed to produce Na metal cells.

Example 10

Organic Material ($Na_2C_6O_6$) as a Cathode Active Material of a Sodium Metal Battery In order to synthesize disodium rhodizonate ($Na_2C_6O_6$), the rhodizonic acid dihydrate (species 1 in the following scheme) was used as a precursor. A basic sodium salt, $Na_2CO_3$ can be used in aqueous media to neutralize both enediolic acid functions. Strictly stoichiometric quantities of both reactants, rhodizonic acid and sodium carbonate, were allowed to react for 10 hours to achieve a yield of 80%. Disodium rhodizonate (species 2) was readily soluble even in a small amount of water, implying that water molecules are present in species 2. Water was removed in a vacuum at 180° C. for 3 hours to obtain the anhydrous version (species 3).

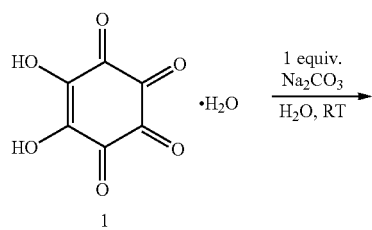

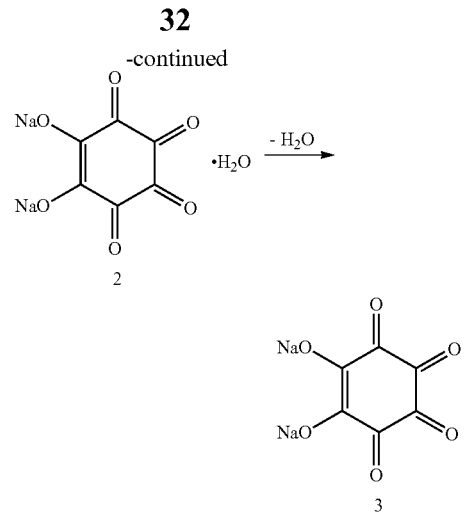

A mixture of a cathode active material ($Na_2C_6O_6$) and a conductive additive (carbon black, 15%) was ball-milled for 10 minutes and the resulting blend was grinded to produce composite particles. The electrolyte was 1M of sodium hexafluorophosphate ($NaPF_6$) in PC-EC.

It may be noted that the two Na atoms in the formula $Na_2C_6O_6$ are part of the fixed structure and they do not participate in reversible lithium ion storing and releasing. This implies that sodium ions must come from the anode side. Hence, there must be a sodium source (e.g. sodium metal or sodium metal alloy) at the anode. As illustrated in FIG. 1(E), the anode current collector (Cu foil) is deposited with a layer of sodium (e.g. via sputtering or electrochemical plating). This can be done prior to assembling the sodium-coated layer or simply a sodium foil, a porous separator, and a foamed cathode current collector into a dry cell. The pores of the cathode current collector are them infiltrated with the suspension of cathode active material and conductive additive ($Na_2C_6O_6$/C composite particles) dispersed in the liquid electrolyte. For comparison, the corresponding conventional Na metal cell was also fabricated by the conventional procedures of slurry coating, drying, laminating, packaging, and electrolyte injection.

Example 11

Metal Naphthalocyanine-RGO Hybrid Cathode of a Sodium Metal Battery

CuPc-coated graphene sheets were obtained by vaporizing CuPc in a chamber along with a graphene film (5 nm) prepared from spin coating of RGO-water suspension. The resulting coated film was cut and milled to produce CuPc-coated graphene sheets, which were used as a cathode active material in a sodium metal battery having a sodium metal foil as the anode active material and 1 M of $NaClO_4$ in propylene carbonate (PC) solution as the electrolyte.

Example 12

Preparation of $MoS_2$/RGO Hybrid Material as a Cathode Active Material of a Na Metal Battery A wide variety of inorganic materials were investigated in this example. For instance, an ultra-thin $MoS_2$/RGO hybrid was synthesized by a one-step solvothermal reaction of $(NH_4)_2MoS_4$ and hydrazine in an N, N-dimethylformamide (DMF) solution of oxidized graphene oxide (GO) at 200° C. In a typical procedure, 22 mg of $(NH_4)_2MoS_4$ was added to 10 mg of GO dispersed in 10 ml of DMF. The mixture was sonicated at room temperature for approximately 10 min until a clear and homogeneous solution was obtained. After that, 0.1 ml of $N_2H_4 \cdot H_2O$ was added. The reaction solution was further sonicated for 30 min before being transferred to a 40 mL Teflon-lined autoclave. The system was heated in an oven at 200° C. for 10 h. Product was collected by centrifugation at 8000 rpm for 5 min, washed with DI water and recollected by centrifugation. The washing step was repeated for at least 5 times to ensure that most DMF was removed. Finally, product was dried and made into a cathode.

Example 13

Preparation of Two-Dimensional (2D) Layered $Bi_2Se_3$ Chalcogenide Nanoribbons

The preparation of (2D) layered $Bi_2Se_3$ chalcogenide nanoribbons is well-known in the art. For instance, $Bi_2Se_3$ nanoribbons were grown using the vapor-liquid-solid (VLS) method. Nanoribbons herein produced are, on average, 30-55 nm thick with widths and lengths ranging from hundreds of nanometers to several micrometers. Larger nanoribbons were subjected to ball-milling for reducing the lateral dimensions (length and width) to below 200 nm. Nanoribbons prepared by these procedures (with or without the presence of graphene sheets or exfoliated graphite flakes) were used as a cathode active material of a Na or K metal battery. Surprisingly, $Bi_2Se_3$ chalcogenide nanoribbons are capable of storing both Na and K ions on their surfaces.

Example 14

MXenes Powder+Chemically Activated RGO

Selected MXenes, were produced by partially etching out certain elements from layered structures of metal carbides such as $Ti_3AlC_2$. For instance, an aqueous 1 M $NH_4HF_2$ was used at room temperature as the etchant for $Ti_3AlC_2$. Typically, MXene surfaces are terminated by O, OH, and/or F groups, which is why they are usually referred to as $M_{n+1}X_nT_x$, where M is an early transition metal, X is C and/or N, T represents terminating groups (O, OH, and/or F), n=1, 2, or 3, and x is the number of terminating groups. The MXene materials investigated include $Ti_2CT_x$, $Nb_2CT_x$, $V_2CT_x$, $Ti_3CNT_x$, and $Ta_4C_3T_x$. Typically, 35-95% MXene and 5-65% graphene sheets were mixed in a liquid electrolyte and injected into pores of foamed current collector.

Example 15

Preparation of Graphene-Supported $MnO_2$ and $NaMnO_2$ Cathode Active Material

The $MnO_2$ powder was synthesized by two methods (each with or without the presence of graphene sheets). In one method, a 0.1 mol/L $KMnO_4$ aqueous solution was prepared by dissolving potassium permanganate in deionized water. Meanwhile 13.32 g surfactant of high purity sodium bis(2-ethylhexyl) sulfosuccinate was added in 300 mL iso-octane (oil) and stirred well to get an optically transparent solution. Then, 32.4 mL of 0.1 mol/L $KMnO_4$ solution and selected amounts of GO solution were added in the solution, which was ultrasonicated for 30 min to prepare a dark brown precipitate. The product was separated, washed several times with distilled water and ethanol, and dried at 80° C. for 12 h. The sample is graphene-supported $MnO_2$ in a powder form, which was dispersed in a liquid electrolyte to form a slurry and injected into pores of a foamed current collector.

Additionally, $NaMnO_2$ and $NaMnO_2$/graphene composite were synthesized by ball-milling mixtures of $Na_2CO_3$ and $MnO_2$ (at a molar ratio of 1:2), with or without graphene sheets, for 12 h followed by heating at 870° C. for 10 h.

Example 16

Preparation of Electrodes for Potassium Metal Cells

A sheet of potassium film was used as the anode active material while a layer of PVDF-bonded reduced graphene oxide (RGO) sheets, supplied from Angstron Materials, Inc. (Dayton, Ohio), was used as the cathode active material. The electrolyte used was 1 M of $KClO_4$ salt dissolved in a mixture of propylene carbonate and DOL (1/1 ratio). Charge-discharge curves were obtained at several current densities (from 50 mA/g to 50 A/g), corresponding to different C rates, with the resulting energy density and power density data measured and calculated.

Example 17

Preparation and Electrochemical Testing of Various Battery Cells

For most of the anode and cathode active materials investigated, we prepared alkali metal-ion cells or alkali metal cells using both the presently invented method and the conventional method.

With the conventional method, a typical anode composition includes 85 wt. % active material (e.g., Sn- or $Na_2C_8H_4O_4$-coated graphene sheets), 7 wt. % acetylene black (Super-P), and 8 wt. % polyvinylidene fluoride binder (PVDF, 5 wt. % solid content) dissolved in N-methyl-2-pyrrolidinoe (NMP). After coating the slurries on Cu foil, the electrodes were dried at 120° C. in vacuum for 2 h to remove the solvent. With the instant method, typically no binder resin is needed or used, saving 8% weight (reduced amount of non-active materials). Cathode layers are made in a similar manner (using Al foil as the cathode current collector) using the conventional slurry coating and drying procedures. An anode layer, separator layer (e.g. Celgard 2400 membrane), and a cathode layer are then laminated together and housed in a plastic-Al envelop. The cell is then injected with 1 M $NaPF_6$ electrolyte solution dissolved in a mixture of ethylene carbonate (EC) and diethyl carbonate (DEC) (EC-DEC, 1:1 v/v). In some cells, ionic liquids were used as the liquid electrolyte. The cell assemblies were made in an argon-filled glove-box.

In the presently invented process, preferably the anode current collector, the separator, and the cathode current collector are assembled in a protective housing before or after the injecting (or impregnation) of the first suspension and/or the injecting (or impregnation) of the second suspension. In some examples, we assembled an empty foamed anode current collector, a porous separator layer, and an empty foamed current collector together to form an assembly that was housed in a pouch (made of Al-nylon bi-layer film). The first suspension was then injected into the anode current collector and the second suspension was injected into the cathode current collector. The pouch was then sealed. In other examples, we impregnated a foamed anode current collector with the first suspension to form an anode layer and, separately, impregnated a foamed cathode current collector with the second suspension to form a cathode layer. The anode layer, a porous separator layer, and the cathode layer were then assembled and housed in a pouch to form a cell.

The cyclic voltammetry (CV) measurements were carried out using an Arbin electrochemical workstation at a typical scanning rate of 1 mV/s. In addition, the electrochemical performances of various cells were also evaluated by galvanostatic charge/discharge cycling at a current density of from 50 mA/g to 10 A/g. For long-term cycling tests, multi-channel battery testers manufactured by LAND were used.

It may be noted that, in lithium-ion battery industry, it is a common practice to define the cycle life of a battery as the number of charge-discharge cycles that the battery suffers 20% decay in capacity based on the initial capacity measured after the required electrochemical formation. The same definition for the cycle life of a Na-ion or K-ion cell is herein followed.

Example 18

Representative Testing Results

Figure 5:
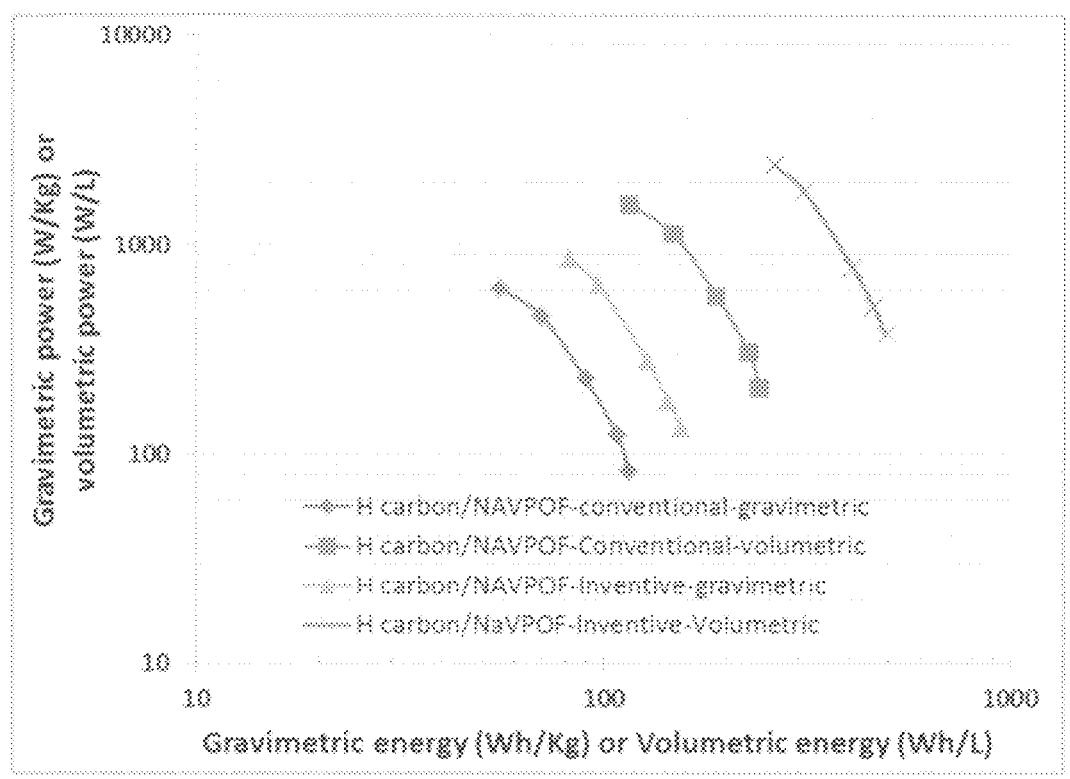
FIG. 5 Ragone plots (gravimetric and volumetric power density vs. energy density) of Na-ion battery cells containing hard carbon particles as the anode active material and carbon-coated $Na_3V_2(PO_4)_2F_3$ particles as the cathode active materials. Two of the 4 data curves are for the cells prepared according to an embodiment of instant invention and the other two by the conventional slurry coating of electrodes (roll-coating).

For each sample, several current densities (representing charge/discharge rates) were imposed to determine the electrochemical responses, allowing for calculations of energy density and power density values required of the construction of a Ragone plot (power density vs. energy density). Shown in FIG. 5 are Ragone plots (gravimetric and volumetric power density vs. energy density) of Na-ion battery cells containing hard carbon particles as the anode active material and carbon-coated $Na_3V_2(PO_4)_2F_3$ particles as the cathode active materials. Two of the 4 data curves are for the cells prepared according to an embodiment of instant invention and the other two by the conventional slurry coating of electrodes (roll-coating). Several significant observations can be made from these data:

Both the gravimetric and volumetric energy densities and power densities of the sodium-ion battery cells prepared by the presently invented method (denoted as "inventive" in the figure legend) are significantly higher than those of their counterparts prepared via the conventional roll-coating method (denoted as "conventional"). A change from an anode thickness of 150 μm (coated on a flat solid Cu foil) to a thickness of 225 μm (all accommodated in pores of a Ni foam having 85% porosity) and a corresponding change in the cathode to maintain a balanced capacity ratio results in a gravimetric energy density increase from 115 Wh/kg to 154 Wh/kg. Even more surprisingly, the volumetric energy density is increased from 241 Wh/L to 493 Wh/L. This latter value of 493 Wh/L is exceptional for a sodium-ion battery using a hard carbon anode and a sodium transition metal phosphate-type cathode.

These huge differences cannot be simply ascribed to the increases in the electrode thickness and the mass loading. The differences are likely due to the significantly higher active material mass loading (relative to other materials) associated with the presently invented cells, reduced proportion of overhead (non-active) components relative to the active material weight/volume, no need to have a binder resin, surprisingly better utilization of the electrode active material (most, if not all, of the hard carbon particles and $Na_3V_2(PO_4)_2F_3$ particles contributing to the sodium ion storage capacity; no dry pockets or ineffective spots in the electrode, particularly under high charge/discharge rate conditions), and the surprising ability of the inventive method to more effectively pack active material particles in the pores of the foamed current collector.

Figure 6:
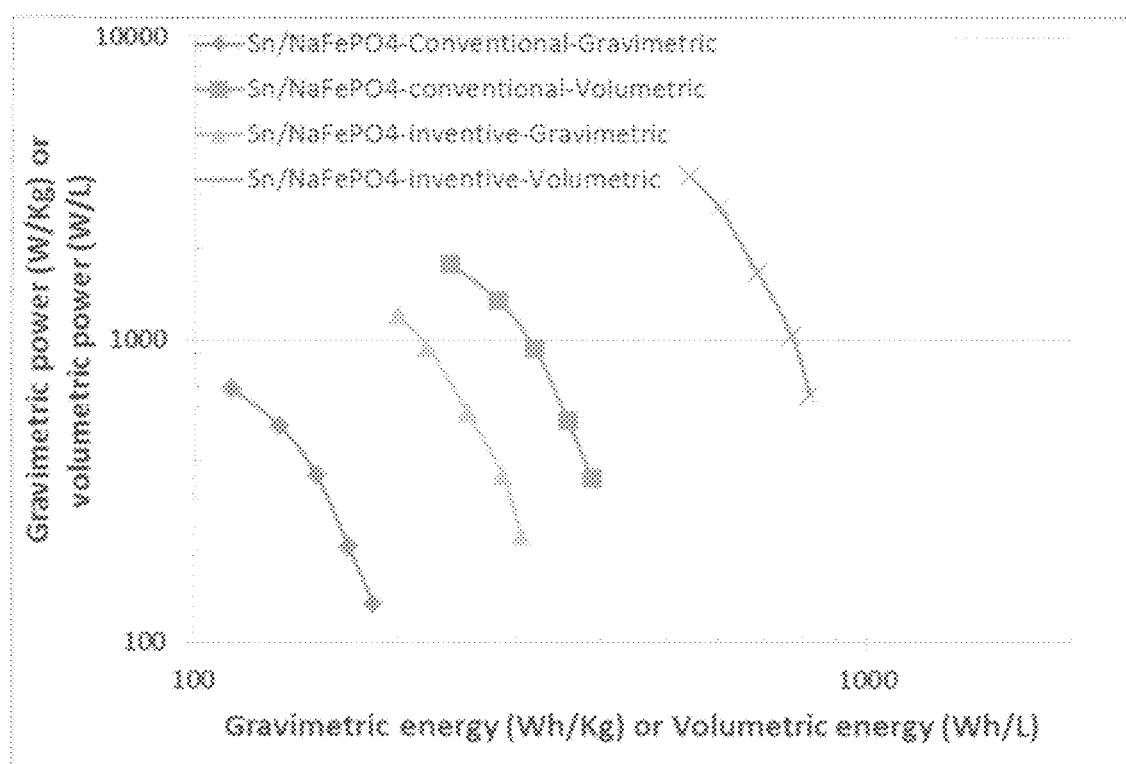
FIG. 6 Ragone plots (both gravimetric and volumetric power density vs. gravimetric and volumetric energy density) of two cells, both containing graphene-embraced Sn nano particles as the anode active material and $NaFePO_4$ nano particles as the cathode active material. The data are for both sodium ion cells prepared by the presently invented method and those by the conventional slurry coating of electrodes.

FIG. 6 shows the Ragone plots (both gravimetric and volumetric power density vs. gravimetric and volumetric energy density) of two cells, both containing graphene-embraced Sn nano particles as the anode active material and $NaFePO_4$ nano particles as the cathode active material. The experimental data were obtained from the Na-ion battery cells that were prepared by the presently invented method and those by the conventional slurry coating of electrodes.

These data indicate that both the gravimetric and volumetric energy densities and power densities of the battery cells prepared by the presently invented method are significantly higher than those of their counterparts prepared via the conventional method. Again, the differences are huge. The conventionally made cells exhibit a gravimetric energy density of 185 Wh/kg and volumetric energy density of 388 Wh/L, but the presently invented cells deliver 305 Wh/kg and 823 Wh/L, respectively. The cell-level volumetric energy density of 823 Wh/L has never been previously achieved with any rechargeable sodium batteries. In fact, even the state-of-the-art lithium-ion battery rarely exhibits a volumetric energy density higher than 750 Wh/L. The power densities as high as 1205 W/kg and 3,495 W/L are also unprecedented for typically higher-energy lithium-ion batteries, let alone for sodium-ion batteries.

These energy density and power density differences are mainly due to the high active material mass loading (>25 mg/cm$^2$ in the anode and >45 mg/cm$^2$ in the cathode) associated with the presently invented cells, reduced proportion of overhead (non-active) components relative to the active material weight/volume, no need to have a binder resin, the ability of the inventive method to better utilize the active material particles (all particles being accessible to liquid electrolyte and fast ion and electron kinetics), and to more effectively pack active material particles in the pores of the foamed current collectors.

Figure 7:
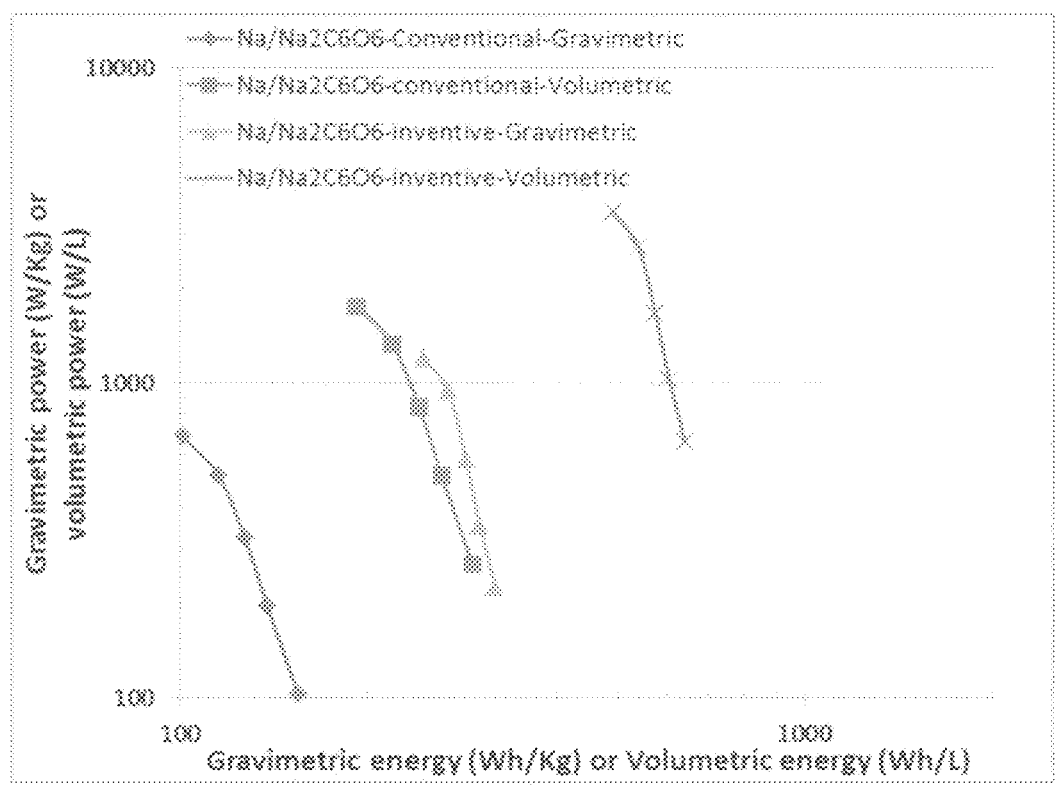
FIG. 7 Ragone plots of sodium metal batteries containing a sodium foil as the anode active material, disodium rhodizonate ($Na_2C_6O_6$) as the cathode active material, and sodium salt ($NaPF_6$)-PC/DEC as organic liquid electrolyte. The data are for both sodium metal cells prepared by the presently invented method and those by the conventional slurry coating of electrodes.

Shown in FIG. 7 are Ragone plots of sodium metal batteries containing a sodium foil as the anode active material, disodium rhodizonate ($Na_2C_6O_6$) as the cathode active material, and lithium salt ($NaPF_6$)-PC/DEC as organic liquid electrolyte. The data are for both sodium metal cells prepared by the presently invented method and those by the conventional slurry coating of electrodes. These data indicate that both the gravimetric and volumetric energy densities and power densities of the sodium metal cells prepared by the presently invented method are significantly higher than those of their counterparts prepared via the conventional method. Again, the differences are huge and are likely due to the significantly higher active material mass loading associated with the presently invented cells, reduced proportion of overhead (non-active) components relative to the active material weight/volume, no need to have a binder resin, surprisingly better utilization of the electrode active material (most, if not all, of the active material contributing to the sodium ion storage capacity; no dry pockets or ineffective spots in the electrode, particularly under high charge/discharge rate conditions), and the surprising ability of the inventive method to more effectively pack active material particles in the pores of the foamed current collector.

Quite noteworthy and unexpected is the observation that the gravimetric energy density of the presently invented sodium metal-organic cathode cell is as high as 320 Wh/kg, higher than those of all rechargeable sodium metal or sodium-ion batteries ever reported (recall that current Na-ion batteries typically store 100-150 Wh/kg based on the total cell weight). Furthermore, for organic cathode active material-based sodium batteries (even for corresponding lithium batteries), a gravimetric power density of 1,204 W/kg and volumetric power density of 3490 W/L would have been un-thinkable.

It is of significance to point out that reporting the energy and power densities per weight of active material alone on a Ragone plot, as did by many researchers, may not give a realistic picture of the performance of the assembled battery cell. The weights of other device components also must be taken into account. These overhead components, including current collectors, electrolyte, separator, binder, connectors, and packaging, are non-active materials and do not contribute to the charge storage amounts. They only add weights and volumes to the device. Hence, it is desirable to reduce the relative proportion of overhead component weights and increase the active material proportion. However, it has not been possible to achieve this objective using conventional battery production processes. The present invention overcomes this long-standing, most serious problem in the art of lithium batteries.

In commercial lithium-ion batteries having an electrode thickness of 150 μm, the weight proportion of the anode active material (e.g. graphite or carbon) in a lithium-ion battery is typically from 12% to 17%, and that of the cathode active material (for inorganic material, such as $LiMn_2O_4$) from 22% to 41%, or from 10% to 15% for organic or polymeric. The corresponding weight fractions in Na-ion batteries are expected to be very similar since both the anode active materials and cathode active materials have similar physical densities between two types of batteries and the ratio of cathode specific capacity to the anode specific capacity is also similar. Hence, a factor of 3 to 4 may be used to extrapolate the energy or power densities of the device (cell) from the properties based on the active material weight alone. In most of the scientific papers, the properties reported are typically based on the active material weight alone and the electrodes are typically very thin (<<100 μm and mostly <<50 μm). The active material weight is typically from 5% to 10% of the total device weight, which implies that the actual cell (device) energy or power densities may be obtained by dividing the corresponding active material weight-based values by a factor of 10 to 20. After this factor is taken into account, the properties reported in these papers do not really look any better than those of commercial batteries. Thus, one must be very careful when it comes to read and interpret the performance data of batteries reported in the scientific papers and patent applications.

Figure 8:
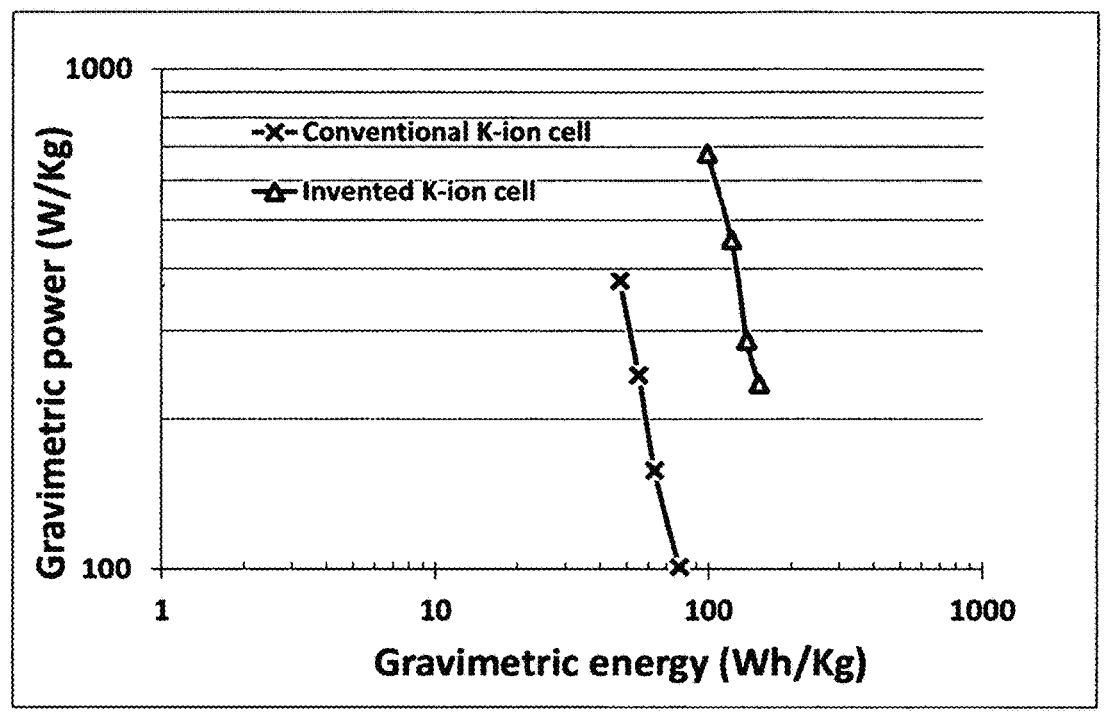
FIG. 8 Ragone plot of a series of K-ion cells prepared by the conventional slurry coating process and the Ragone plot of corresponding K-ion cells prepared by the presently invented process.

The Ragone plot of a series of K-ion cells prepared by the conventional slurry coating process and the Ragone plot of corresponding K-ion cells prepared by the presently invented process are summarized and contrasted in FIG. 8. These data again confirm that the presently invented process works well for both Na and K metal batteries.

Figure 9:
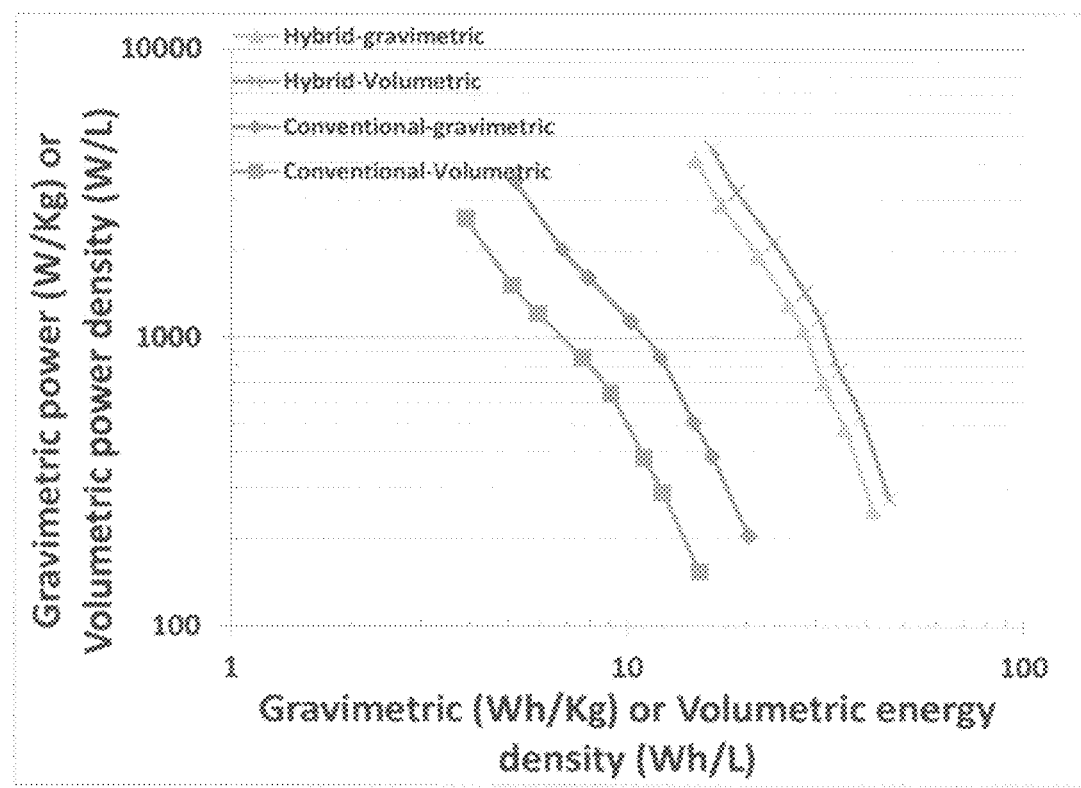
FIG. 9 Ragone plots of a series of hybrid cells having a hybrid anode active material (a mixture of activated carbon particles and $NaTi_2(PO_4)_3$ particles) and $\lambda-MnO_2$ particles as a cathode active material prepared by the conventional slurry coating and those by the presently invented process of direct injection into pores of foamed current collectors.

Shown in FIG. 9 are the Ragone plots of a series of hybrid cells having a hybrid anode active material (a mixture of activated carbon particles and $NaTi_2(PO_4)_3$ particles) and ?-$MnO_2$ particles as a cathode active material prepared by the conventional slurry coating and those by the presently invented process of direct injection into pores of foamed current collectors. The liquid electrolyte is aqueous solution of 2 M of $Na_2SO_4$ in water. These data again demonstrate the effectiveness of the presently invented process in imparting unexpectedly high energy densities, both gravimetric and volumetric, to the hybrid battery cells.

Example 19

Achievable Electrode Thickness and its Effect on Electrochemical Performance of Lithium Battery Cells One might be tempted to think the electrode thickness of an alkali metal battery is a design parameter that can be freely adjusted for optimization of device performance. Contrary to this perception, in reality, the alkali metal battery electrode thickness is manufacturing-limited and one cannot produce electrodes of good structural integrity that exceed certain thickness level in a real industrial manufacturing environment (e.g. a roll-to-roll coating facility). The conventional battery electrode design is based on coating an electrode layer on a flat metal current collector, which has several major problems: (a) A thick coating on Cu foil or Al foil requires a long drying time (requiring a heating zone 30-100 meters long). (b) Thick electrodes tend to get delaminated or cracked upon drying and subsequent handling, and even with a resin binder proportion as high as 15-20% to hopefully improve the electrode integrity this problem remains a major limiting factor. Thus, such an industry practice of roll-coating of slurry on a solid flat current collector does not allow for high active material mass loadings. (c) A thick electrode prepared by coating, drying, and compression makes it difficult for electrolyte (injected into a cell after the cell is made) to permeate through the electrode and, as such, a thick electrode would mean many dry pockets or spots that are not wetted by the electrolyte. This would imply a poor utilization of the active materials. The instant invention solves these long-standing, critically important issues associated with alkali metal batteries.

Figure 10:
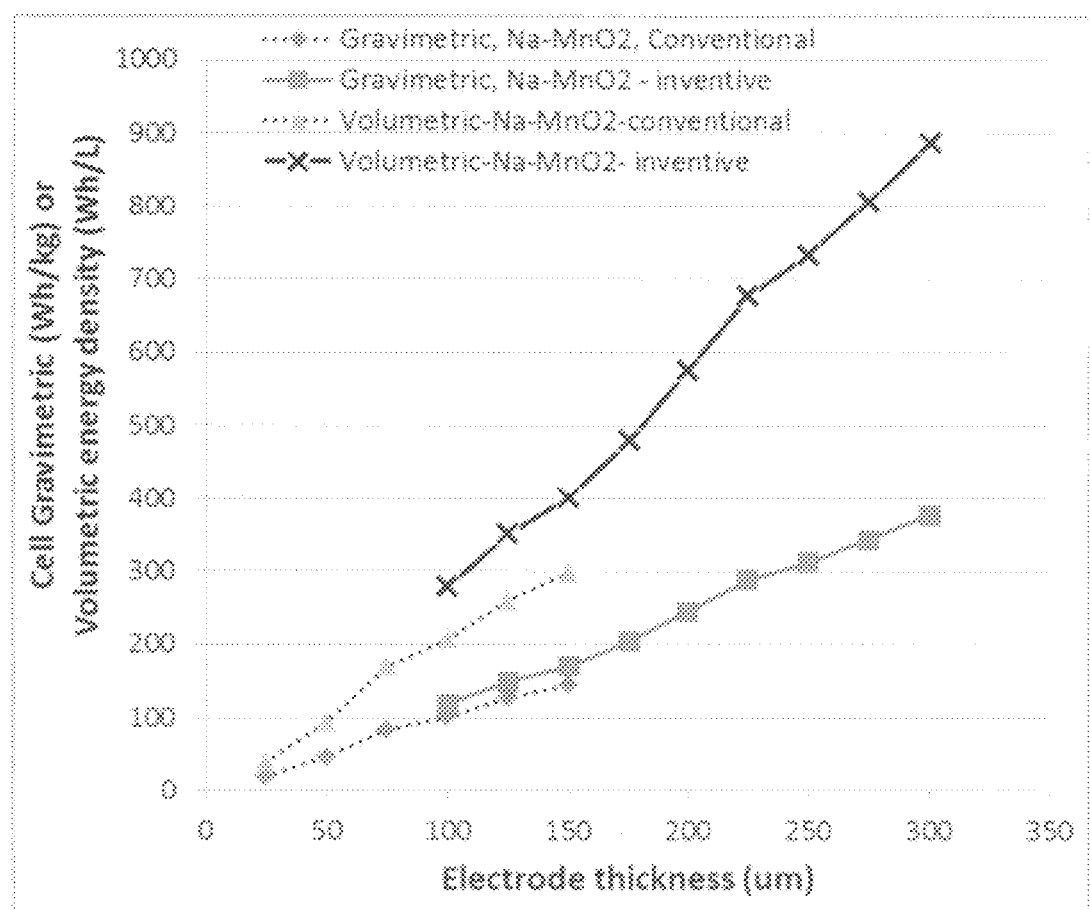
FIG. 10 The cell-level gravimetric (Wh/kg) and volumetric energy densities (Wh/L) of sodium metal cells plotted over the achievable cathode thickness range of the $MnO_2$/RGO cathode prepared via the conventional method without delamination and cracking and those by the presently invented method.

Shown in FIG. 10 are the cell-level gravimetric (Wh/kg) and volumetric energy densities (Wh/L) of sodium metal cells plotted over the achievable cathode thickness range of the $MnO_2$/RGO cathode prepared via the conventional method without delamination and cracking and those by the presently invented method. In this figure, the data points are labelled as the gravimetric (♦) and volumetric (▲) energy density of the conventional Na-$MnO_2$/RGO batteries and the gravimetric (■) and volumetric (×) energy density of the presently invented ones.

The electrodes can be fabricated up to a thickness of 100-200 μm using the conventional slurry coating process. However, in contrast, there is no theoretical limit on the electrode thickness that can be achieved with the presently invented method. Typically, the practical electrode thickness is from 10 μm to 1000 μm, more typically from 100 μm to 800 μm, and most typically from 200 μm to 600 μm.

These data further confirm the surprising effectiveness of the presently invented method in producing ultra-thick sodium battery electrodes not previously achievable. These ultra-thick electrodes in sodium metal batteries lead to exceptionally high cathode active material mass loading, typically significantly >25 mg/cm² (more typically >30 mg/cm², further typically >40 mg/cm², often >50 mg/cm², and even >60 mg/cm²) for an inorganic cathode active material. These high active material mass loadings have not been possible to obtain with conventional alkali metal batteries made by the slurry coating processes. These high active material mass loadings led to exceptionally high gravimetric and volumetric energy densities that otherwise have not been previously achieved (e.g. 377 Wh/kg and 886 Wh/L of the presently invented sodium metal battery) given the same battery system.

Example 20

Achievable Active Material Weight Percentage in a Cell and its Effect on Electrochemical Performance of Alkali Metal Battery Cells Because the weight of the anode and cathode active materials combined accounts for up to about 30%-50% of the total mass of the packaged commercial lithium batteries, a factor of 30%-50% must be used to extrapolate the energy or power densities of the device from the performance data of the active materials alone. Thus, the energy density of 300 Wh/kg of combined hard carbon and sodium nickel manganese oxide) weights will translate to about 90-150 Wh/kg of the packaged cell. However, this extrapolation is only valid for electrodes with thicknesses and densities similar to those of commercial electrodes (150 μm or about 15 mg/cm$^2$ of the carbon anode and 30 mg/cm$^2$ of transition metal oxide cathode). An electrode of the same active material that is thinner or lighter will mean an even lower energy or power density based on the cell weight. Thus, it would be desirable to produce an alkali metal-ion battery cell having a high active material proportion. Unfortunately, it has not been previously possible to achieve a total active material proportion greater than 45% by weight in most of the commercial alkali metal-ion batteries.

The presently invented method enables the Na, K, and Na/K batteries to go well beyond these limits for all active materials investigated. As a matter of fact, the instant invention makes it possible to elevate the active material proportion above 90% if so desired; but typically from 45% to 85%, more typically from 40% to 80%, even more typically from 40% to 75%, and most typically from 50% to 70%. As a result, we now have a strategy to easily double or triple the energy densities of the same alkali metal cells. This is a highly astonishing and highly useful invention.

Dendrite issues commonly associated with Li, Na, and K metal secondary cells are also resolved by using the presently invented foamed current collector strategy. Hundreds of cells have been investigated and those cells having a foamed anode current collector were not found to fail due to dendrite penetration through the separator. SEM examination of samples from presently invented sodium and potassium cells confirms that the re-deposited alkali metal surfaces on pore walls in a porous anode current collector appear to be smooth and uniform, exhibiting no sign of sharp metal deposit or tree-like features as often observed with corresponding cells having a solid current collector (Cu foil) at the anode. This might be due to a reduced exchange current density associated with a high specific surface area of the foamed current collector at the anode and a more uniform local electric field in such a foamed structure that drives the alkali metal deposition during repeated re-charge procedures.

The invention claimed is:

1. An alkali metal-ion battery or alkali metal battery, wherein said alkali metal is selected from sodium (Na), potassium (K), a combination of Na and K, a combination of Na and/or K with lithium (Li) and said alkali metal does not include lithium alone; said battery comprising:
    (a) an anode having an anode active material and an optional conductive additive dispersed in a first liquid electrolyte to form an anode slurry that is disposed in pores of a 3D porous anode current collector, wherein said 3D porous anode current collector has at least 80% by volume of pores;
    (b) a cathode having a cathode active material and an optional conductive additive dispersed in a second liquid electrolyte to form a cathode slurry that is disposed in pores of a 3D porous cathode current collector which has at least 80% by volume of pores; and
    (c) a separator disposed between said anode and said cathode;

wherein an anode thickness-to-anode current collector thickness ratio is from 0.8/1 to 1/0.8 and/or a cathode thickness-to-cathode current collector thickness ratio is from 0.8/1 to 1/0.8, and wherein said anode active material or said cathode active material constitutes an electrode active material loading greater than 10 mg/cm$^2$, said anode active material and said cathode active material combined exceeds 40% by weight of said battery, and/or said 3D porous anode current collector or cathode current collector has a thickness no less than 200 μm.

2. The alkali metal-ion battery of claim 1, wherein said cathode active material is a sodium or potassium intercalation compound or sodium- or potassium-absorbing compound selected from an inorganic material, an organic or polymeric material, a metal oxide/phosphate/sulfide, or a combination thereof.

3. The alkali metal-ion battery of claim 2, wherein said metal oxide/phosphate/sulfide is selected from a sodium cobalt oxide, sodium nickel oxide, sodium manganese oxide, sodium vanadium oxide, sodium-mixed metal oxide, sodium/potassium-transition metal oxide, sodium iron phosphate, sodium/potassium iron phosphate, sodium manganese phosphate, sodium/potassium manganese phosphate, sodium vanadium phosphate, sodium/potassium vanadium phosphate, sodium mixed metal phosphate, transition metal sulfide, or a combination thereof.

4. The alkali metal-ion battery of claim 2, wherein said inorganic material is selected from sulfur, sulfur compound, lithium polysulfide, transition metal dichalcogenide, a transition metal trichalcogenide, or a combination thereof.

5. The alkali metal-ion battery of claim 2, wherein said inorganic material is selected from $TiS_2$, $TaS_2$, $MoS_2$, $NbSe_3$, $MnO_2$, $CoO_2$, an iron oxide, a vanadium oxide, or a combination thereof.

6. The alkali metal-ion battery of claim 1, wherein said cathode active material contains a sodium intercalation compound or a potassium intercalation compound selected from $NaFePO_4$, $KFePO_4$, $Na_{(1-x)}K_xPO_4$, $Na_{0.7}FePO_4$, $Na_{1.5}VOPO_4F_{0.5}$, $Na_3V_2(PO_4)_3$, $Na_3V_2(PO_4)_2F_3$, $Na_2FePO_4F$, $NaFeF_3$, $NaVPO_4F$, $KVPO_4F$, $Na_3V_2(PO_4)_2F_3$, $Na_{1.5}VOPO_4F_{0.5}$, $Na_3V_2(PO_4)_3$, $NaV_6O_{15}$, $Na_xVO_2$, $Na_{0.33}V_2O_5$, $Na_xCoO_2$, $Na_{2/3}[Ni_{1/3}Mn_{2/3}]O_2$, $Na_x(Fe_{1/2}Mn_{1/2})O_2$, $Na_xMnO_2$, $\lambda$-$MnO_2$, $Na_xK_{(1-x)}MnO_2$, $Na_{0.44}MnO_2$, $Na_{0.44}MnO_2/C$, $Na_4Mn_9O_{18}$, $NaFe_2Mn(PO_4)_3$, $Na_2Ti_3O_7$, $Ni_{1/3}Mn_{1/3}Co_{1/3}O_2$, $Cu_{0.56}Ni_{0.44}HCF$, NiHCF, $Na_xMnO_2$, $NaCrO_2$, $KCrO_2$, $Na_3Ti_2(PO_4)_3$, $NiCo_2O_4$, $Ni_3S_2/FeS_2$, $Sb_2O_4$, $Na_4Fe(CN)_6/C$, $NaV_{1-x}Cr_xPO_4F$, $Se_zS_y$ (y/z=0.01 to 100), Se, Alluaudites, or a combination thereof, wherein x is from 0.1 to 1.0.

7. The alkali metal-ion battery of claim 1, wherein said cathode active material is selected from a functional material or nano-structured material having an alkali metal ion-capturing functional group or alkali metal ion-storing surface in direct contact with said electrolyte.

8. The alkali metal-ion battery of claim 7, wherein said functional group reversibly reacts with an alkali metal ion, forms a redox pair with an alkali metal ion, or forms a chemical complex with an alkali metal ion.

9. The alkali metal-ion battery of claim 7, wherein said functional material or nano-structured material is selected from the group consisting of:
   (a) a nano-structured or porous disordered carbon material selected from particles of a soft carbon, hard carbon, polymeric carbon or carbonized resin, meso-phase carbon, coke, carbonized pitch, carbon black, activated carbon, nano-cellular carbon foam or partially graphitized carbon;
   (b) a nano graphene platelet selected from a single-layer graphene sheet or multi-layer graphene platelet;
   (c) a carbon nanotube selected from a single-walled carbon nanotube or multi-walled carbon nanotube;
   (d) a carbon nano-fiber, nano-wire, metal oxide nano-wire or fiber, conductive polymer nano-fiber, or a combination thereof;
   (e) a carbonyl-containing organic or polymeric molecule;
   (f) a functional material containing a carbonyl, carboxylic, or amine group; and combinations thereof.

10. The alkali metal-ion battery of claim 7, wherein said functional material or nano-structured material is selected from the group consisting of Poly(2,5-dihydroxy-1,4-benzoquinone-3,6-methylene), $Na_xC_6O_6$ (x=1-3), $Na_2(C_6H_2O_4)$, $Na_2C_8H_4O_4$ or Na terephthalate, $Na_2C_6H_4O_4$ or Na trans-trans-muconate), 3,4,9,10-perylenetetracarboxylicacid-dianhydride or PTCDA, sulfide polymer, PTCDA, 1,4,5,8-naphthalene-tetracarboxylicacid-dianhydride or NTCDA, Benzene-1,2,4,5-tetracarboxylic dianhydride, 1,4,5,8-tetrahydroxy anthraquinon, Tetrahydroxy-p-benzoquinone, and combinations thereof.

11. The alkali metal-ion battery of claim 7, wherein said functional material or nano-structured material has a specific surface area of at least 500 $m^2/g$.

12. The alkali metal-ion battery of claim 7, wherein said functional material or nano-structured material has a specific surface area of at least 1,000 $m^2/g$.

13. The alkali metal-ion battery of claim 7, wherein said functional material or nano-structured has a functional group selected from —COOH, =O, —$NH_2$, —OR, or —COOR, where R is a hydrocarbon radical.

14. The alkali metal-ion battery of claim 1, wherein said anode active material contains an alkali ion source selected from an alkali metal, an alkali metal alloy, a mixture of alkali metal or alkali metal alloy with an alkali intercalation compound, an alkali element-containing compound, or a combination thereof.

15. The alkali metal-ion battery of claim 1, wherein said anode active material contains an alkali intercalation compound selected from petroleum coke, carbon black, amorphous carbon, activated carbon, hard carbon, soft carbon, templated carbon, hollow carbon nanowires, hollow carbon sphere, titanates, $NaTi_2(PO_4)_3$, $Na_2Ti_3O_7$, $Na_2C_8H_4O_4$, $Na_2TP$, $Na_xTiO_2$ (x=0.2 to 1.0), $Na_2C_8H_4O_4$, carboxylate based materials, $C_8H_4Na_2O_4$, $C_8H_6O_4$, $C_8H_5NaO_4$, $C_8Na_2F_4O_4$, $C_{10}H_2Na_4O_8$, $C_{14}H_4O_6$, $C_{14}H_4Na_4O_8$, or a combination thereof.

16. The alkali metal-ion battery of claim 15, wherein the alkali intercalation compound or alkali-containing compound is selected from the following groups of materials:
   (f) sodium- or potassium-doped silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof;
   (g) sodium- or potassium-containing alloys or intermetallic compounds of Si, Ge, Sn, Pb, Sb, Bi, Zn, Al, Ti, Co, Ni, Mn, Cd, and their mixtures;
   (h) sodium- or potassium-containing oxides, carbides, nitrides, sulfides, phosphides, selenides, tellurides, or antimonides of Si, Ge, Sn, Pb, Sb, Bi, Zn, Al, Fe, Ti, Co, Ni, Mn, Cd, and mixtures or composites thereof;
   (i) sodium or potassium salts; and
   (j) graphene sheets pre-loaded with sodium ions or potassium ions.

17. The alkali metal-ion battery of claim 15, wherein said the graphene sheets pre-loaded with sodium ions or potassium ions are selected from pre-sodiated or pre-potassiated versions of pristine graphene, graphene oxide, reduced graphene oxide, graphene fluoride, graphene chloride, graphene bromide, graphene iodide, hydrogenated graphene, nitrogenated graphene, boron-doped graphene, nitrogen-doped graphene, chemically functionalized graphene a physically or chemically activated or etched version thereof, or a combination thereof.

18. The alkali metal-ion battery of claim 1, wherein said first or second liquid electrolyte is selected from an aqueous electrolyte, organic electrolyte, ionic liquid electrolyte, mixture of an organic electrolyte and an ionic electrolyte, or a mixture thereof with a polymer.

19. The alkali metal-ion battery of claim 18, wherein said aqueous electrolyte contains a sodium salt or a potassium salt dissolved in water or a mixture of water and alcohol.

20. The alkali metal-ion battery of claim 19, wherein said sodium salt or potassium salt is selected from $Na_2SO_4$, $K_2SO_4$, a mixture thereof, NaOH, KOH, NaCl, KCl, NaF, KF, NaBr, KBr, NaI, KI, or a mixture thereof.

21. The alkali metal-ion battery of claim 18, wherein said organic electrolyte contains a liquid organic solvent selected from the group consisting of 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma.-butyrolactone (y-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofloroether, and combinations thereof.

22. The alkali metal-ion battery of claim 18, wherein said organic electrolyte contains a non-lithium alkali metal salt selected from sodium perchlorate ($NaClO_4$), potassium perchlorate ($KClO_4$), sodium hexafluorophosphate ($NaPF_6$), potassium hexafluorophosphate ($KPF_6$), sodium borofluoride ($NaBF_4$), potassium borofluoride ($KBF_4$), sodium hexafluoroarsenide, potassium hexafluoroarsenide, sodium trifluoro-metasulfonate ($NaCF_3SO_3$), potassium trifluorometasulfonate ($KCF_3SO_3$), bis-trifluoromethyl sulfonylimide sodium ($NaN(CF_3SO_2)_2$), sodium trifluoromethanesulfonimide (NaTFSI), bis-trifluoromethyl sulfonylimide potassium ($KN(CF_3SO_2)_2$), or a combination thereof.

23. The alkali metal-ion battery of claim 18, wherein said ionic liquid electrolyte contains an ionic liquid solvent selected from a room temperature ionic liquid having a cation selected from tetra-alkylammonium, di-, tri-, or tetra-alkylimidazolium, alkylpyridinium, dialkyl-pyrrolidinium, dialkylpiperidinium, tetraalkylphosphonium, trialkylsulfonium, or a combination thereof.

24. The alkali metal-ion battery of claim 23, wherein said ionic liquid solvent is selected from a room temperature ionic liquid having an anion selected from $BF_4^-$, $B(CN)_4^-$, $CH_3BF_3^-$, $CH_2CHBF_3^-$, $CF_3BF_3^-$, $C_2F_5BF_3^-$, $n\text{-}C_3F_7BF_3^-$, $n\text{-}C_4F_9BF_3^-$, $PF_6^-$, $CF_3CO_2^-$, $CF_3SO_3^-$, $N(SO_2CF_3)_2^-$, $N(COCF_3)(SO_2CF_3)^-$, $N(SO_2F)_2^-$, $N(CN)_2^-$, $C(CN)_3^-$, $SCN^-$, $SeCN^-$, $CuCl_2^-$, $AlCl_4^-$, $F(HF)_{2.3}^-$, or a combination thereof.

25. The alkali metal-ion battery of claim 1, wherein said 3D porous anode current collector or 3D porous cathode current collector contains a conductive foam structure having a thickness no less than 200 μm, having at least 85% by volume of pores, and/or said anode active material has a mass loading no less than 25 mg/cm$^2$, occupies at least 25% by weight or by volume of the entire battery cell, and/or the cathode active material has a mass loading no less than 20 mg/cm$^2$ for an organic or polymer material or no less than 45 mg/cm$^2$ for an inorganic and non-polymer material in said cathode, and/or occupies at least 45% by weight or by volume of the entire battery cell.

26. The alkali metal-ion battery of claim 1, wherein said 3D porous anode current collector or 3D porous cathode current collector contains a conductive foam structure having a thickness no less than 300 μm, at least 90% by volume of pores, and/or said anode active material has a mass loading no less than 30 mg/cm$^2$, occupies at least 30% by weight or by volume of the entire battery cell, and/or the cathode active material has a mass loading no less than 25 mg/cm$^2$ for an organic or polymer material or no less than 50 mg/cm$^2$ for an inorganic and non-polymer material in said cathode and/or occupies at least 50% by weight or by volume of the entire battery cell.

27. The alkali metal-ion battery of claim 1, wherein said 3D porous anode current collector or 3D porous cathode current collector contains a conductive foam structure having a thickness no less than 400 μm, having at least 95% by volume of pores, and/or said anode active material has a mass loading no less than 35 mg/cm$^2$, occupies at least 35% by weight or by volume of the entire battery cell, and/or the cathode active material has a mass loading no less than 30 mg/cm$^2$ for an organic or polymer material or no less than 55 mg/cm$^2$ for an inorganic and non-polymer material in said cathode and/or occupies at least 55% by weight or by volume of the entire battery cell.

28. The alkali metal-ion battery of claim 1, wherein said 3D porous anode current collector or 3D porous cathode current collector contains a conductive foam structure selected from metal foam, metal web or screen, perforated metal sheet-based 3-D structure, metal fiber mat, metal nanowire mat, conductive polymer nano-fiber mat, conductive polymer foam, conductive polymer-coated fiber foam, carbon foam, graphite foam, carbon aerogel, carbon xerogel, graphene foam, graphene oxide foam, reduced graphene oxide foam, carbon fiber foam, graphite fiber foam, exfoliated graphite foam, or a combination thereof.

29. An alkali metal-ion battery or alkali metal battery, wherein said alkali metal is selected from sodium (Na), potassium (K), a combination of Na and K, a combination of Na and/or K with lithium (Li) and said alkali metal does not include lithium alone; said battery comprising:
(a) an anode having an anode active material coated on or in physical contact with an anode current collector wherein said anode active material is in ionic contact with a first liquid electrolyte;
(b) a cathode having a cathode active material and an optional conductive additive dispersed in a second liquid electrolyte disposed in pores of a 3D porous cathode current collector which has at least 80% by volume of pores, wherein a cathode thickness-to-cathode current collector thickness ratio is from 0.8/1 to 1/0.8; and
(c) a separator disposed between said anode and said cathode;
wherein said athode active material constitutes an electrode active material loading greater than 20 mg/cm$^2$, said anode active material and said cathode active material combined exceeds 30% by weight of said battery, and/or said 3D porous cathode current collector has a thickness no less than 200 μm.

30. The alkali metal battery of claim 2, wherein said anode current collector contains a porous foamed structure.

* * * * *

UNITED STATES PATENT AND TRADEMARK OFFICE
CERTIFICATE OF CORRECTION

| | | |
|---|---|---|
| PATENT NO. | : 9,735,445 B2 | Page 1 of 2 |
| APPLICATION NO. | : 14/756510 | |
| DATED | : August 15, 2017 | |
| INVENTOR(S) | : Aruna Zhamu and Bor Z. Jang | |

It is certified that error appears in the above-identified patent and that said Letters Patent is hereby corrected as shown below:

Claim 16 at Column 41, Line 60 through Column 42, Line 10 reads:
"16. The alkali metal-ion battery of claim 15, wherein the alkali intercalation compound or alkali-containing compound is selected from the following groups of materials:
(f) sodium- or potassium-doped silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof;
(g) sodium- or potassium-containing alloys or intermetallic compounds of Si, Ge, Sn, Pb, Sb, Bi, Zn, Al, Ti, Co, Ni, Mn, Cd, and their mixtures;
(h) sodium- or potassium-containing oxides, carbides, nitrides, sulfides, phosphides, selenides, tellurides, or antimonides of Si, Ge, Sn, Pb, Sb, Bi, Zn, Al, Fe, Ti, Co, Ni, Mn, Cd, and mixtures or composites thereof;
(i) sodium or potassium salts; and
(j) graphene sheets pre-loaded with sodium ions or potassium ions."
But should read:
--16. The alkali metal-ion battery of claim 15, wherein the alkali intercalation compound or alkali-containing compound is selected from the following groups of materials:
(a) sodium- or potassium-doped silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof;
(b) sodium- or potassium-containing alloys or intermetallic compounds of Si, Ge, Sn, Pb, Sb, Bi, Zn, Al, Ti, Co, Ni, Mn, Cd, and their mixtures;
(c) sodium- or potassium-containing oxides, carbides, nitrides, sulfides, phosphides, selenides, tellurides, or antimonides of Si, Signed and Sealed this
Twelfth Day of February, 2019

Andrei Iancu
*Director of the United States Patent and Trademark Office*

CERTIFICATE OF CORRECTION (continued)
U.S. Pat. No. 9,735,445 B2

Ge, Sn, Pb, Sb, Bi, Zn, Al, Fe, Ti, Co, Ni, Mn, Cd, and mixtures or composites thereof;
(d) sodium or potassium salts; and
(e) graphene sheets pre-loaded with sodium ions or potassium ions.--

Claim 17 at Column 42, Line 19 reads:
"phene, chemically functionalized graphene a physically or"
But should read:
--phene, chemically functionalized graphene, a physically or--

Claim 21 at Column 42, Lines 43-44 reads:
"methyl propionate, propylene carbonate (PC), gamma.-butyrolactone (y-BL), acetonitrile (AN), ethyl acetate (EA),"
But should read:
--methyl propionate, propylene carbonate (PC), $\gamma$-butyrolactone ($\gamma$-BL), acetonitrile (AN), ethyl acetate (EA),--